(12) United States Patent
Cesa

(10) Patent No.: US 7,201,882 B2
(45) Date of Patent: Apr. 10, 2007

(54) DEVICE FOR PRODUCING A PLASMA, IONIZATION METHOD, USE OF SAID METHOD AND PRODUCTION PROCESSES USING SAID DEVICE

(75) Inventor: Valentin Cesa, Largentiere (FR)

(73) Assignee: Clarq International (Societe Civile), Joyeuse (FR)

( * ) Notice: Subject to any disclaimer, the term of this patent is extended or adjusted under 35 U.S.C. 154(b) by 791 days.

(21) Appl. No.: 10/381,254

(22) PCT Filed: Sep. 20, 2001

(86) PCT No.: PCT/FR01/02934

§ 371 (c)(1),
(2), (4) Date: Mar. 24, 2003

(87) PCT Pub. No.: WO02/26004

PCT Pub. Date: Mar. 28, 2002

(65) Prior Publication Data

US 2004/0096375 A1    May 20, 2004

(51) Int. Cl.
*B01J 19/08* (2006.01)
(52) U.S. Cl. ............... 422/186.04; 204/164; 123/536; 123/538; 60/39.821
(58) Field of Classification Search ........... 422/186.04; 204/164; 123/536, 538; 60/39.821
See application file for complete search history.

(56) References Cited

U.S. PATENT DOCUMENTS

| 4,419,329 | A | 12/1983 | Heller |
| 5,316,076 | A | 5/1994 | Sandstroem et al. |

FOREIGN PATENT DOCUMENTS

| HU | 202 021 B | 1/1991 |
| WO | WO 96 23400 | 8/1996 |

OTHER PUBLICATIONS

Database WPI, Section Ch, Week 198938, Derwent Publications, Ltd., London, GB, AN 1989-276982, XP002169879 & SU 1 468 854 a (Kiuibyshev Poly), Mar. 30, 1989.

*Primary Examiner*—Kishor Mayekar
(74) *Attorney, Agent, or Firm*—Young & Thompson

(57) ABSTRACT

In the field of transformation of material there is a device for producing a plasma, a method for ionizing material using the device, uses of the inventive method and production processes using the device. The device includes a resonant chamber, an acoustic chamber provided with an acoustic device and a soliton chamber for receiving the treated material coming from the resonant chamber while simultaneously generating a recycling of outside air. The soliton chamber defines, with a pulsating suction member adjacent to the output of the soliton chamber, a space producing ionized material.

53 Claims, 12 Drawing Sheets

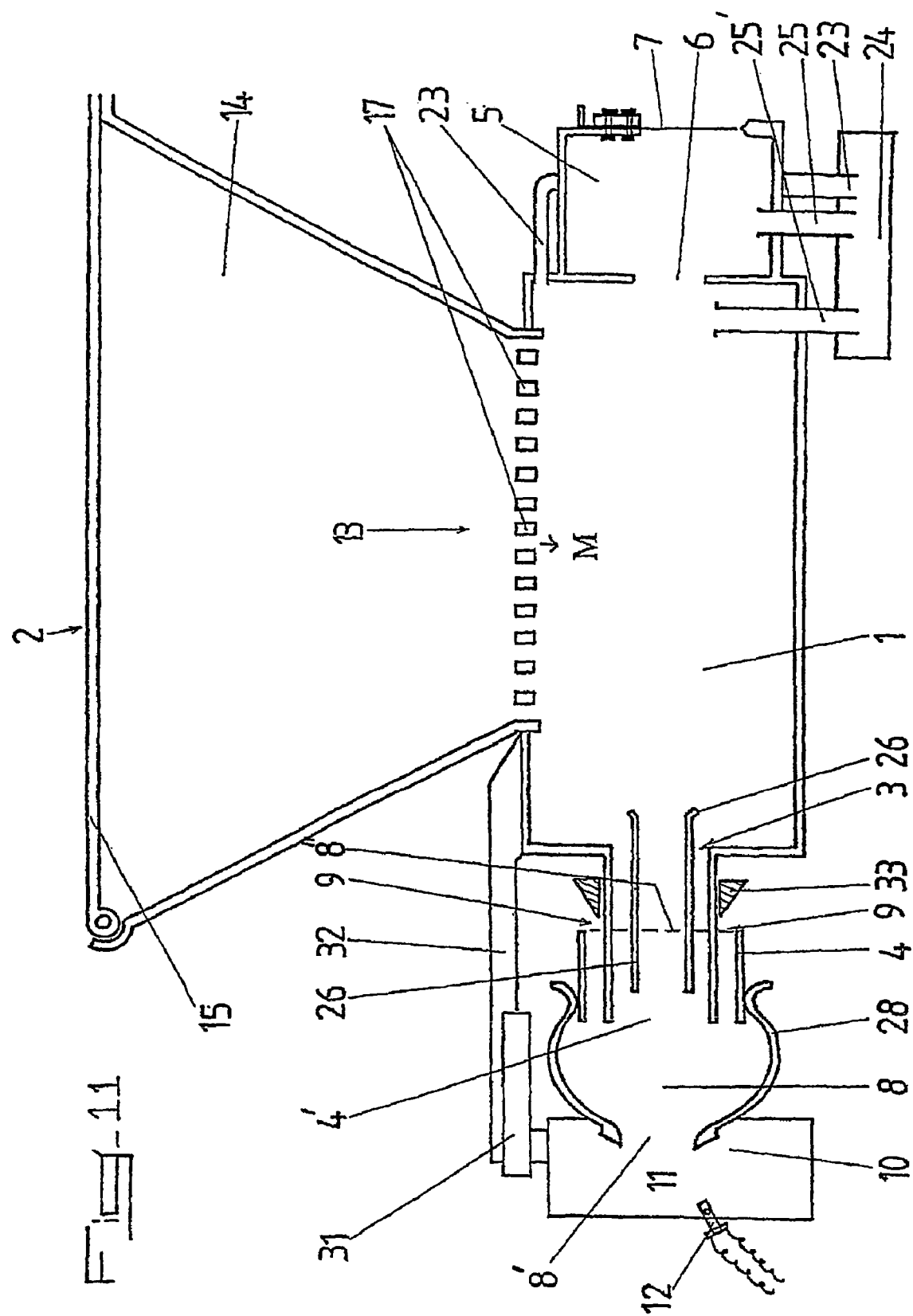

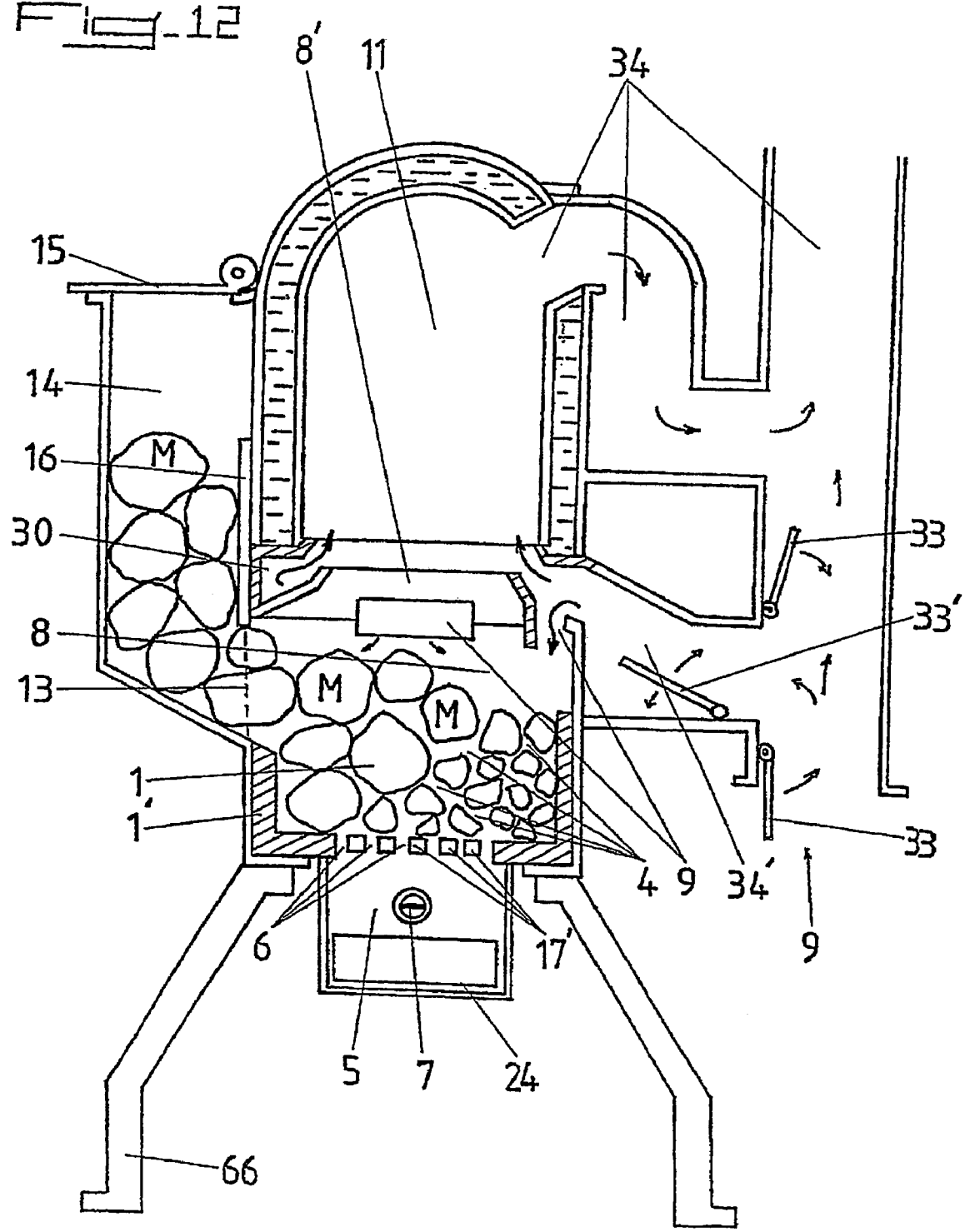

DEVICE FOR PRODUCING A PLASMA, IONIZATION METHOD, USE OF SAID METHOD AND PRODUCTION PROCESSES USING SAID DEVICE

BACKGROUND OF THE INVENTION

The present invention relates to the field of transformation of matter and concerns a device for producing a plasma by a reaction involving combustion of a substance or a mixture of substances M, a process for ionisation or transformation of the substance employing this device, applications of the process according to the invention and embodiments employing the device according to the invention.

At present, thermal agitation is the only known process for constructing a combustion reaction. This process involves intimately mixing the fuel with the oxygen carrier and agitating the mixture using a thermodynamic stress, in other words increasing the entropy or the disorder of this mixture in order to increase the probability of effective meeting of the reacted entities. Solid fuels are themselves then subjected to the turbulent stream of the oxygen-carrying air.

The field of pulsatory combustion would tend to proceed differently within a steady stream. However, this case, which defies conventional description, operates perfectly only at low frequencies of the pulsating stream compatible with the undulating rate of propagation of the flame front. Beyond this, the turbulence due to the entropy-generating higher frequencies destroy the coherence between the thermal procedure and the steady system, the yields falling rapidly to the point where the flame decays.

Owing to the incoherence due to thermal agitation, the probability of meetings between particles is slight and not all collisions are effective. Of the meetings, those which are actually effective have a slight range of movement which leads only to instantaneous ionisation followed by oxidation which reforms associated chemical species. This type of reaction creates unburnt residues and oxides which are increasingly harmful to the earth's atmosphere.

Under these conditions, the production of energy by combustion involves making a choice between the production of quantities of unburnt residues or the disposal of harmful oxidation products.

The static devices subjected to the pulsations of the smoke ducts which lead to reduction in frequency by beating in the combustion chambers produce a large amount of unburnt residues. It is therefore common for the smoke duct to block in three weeks of use.

The power couple of heat engines of which the output is low in relation to the energy capacity of the fuels decreases rapidly when the mechanical speed exceeds a certain threshold of correlation with the reaction rate characterised by the propagation of the flame front. It is therefore necessary to use fuels having improved kinetic velocities, but this increases the production of nitrogen oxides in proportion with the combustion temperature.

This range of validity is even smaller in burners in which adjustments are very sharp, on the one hand to stabilise the flames and, on the other hand, to select the best yield in view of the dilemma between the production of unburnt residues and the disposal of oxidation products. An equilibrium is therefore required between limiting unburnt residues and limiting the production of oxides, which are all just as harmful as one another and have known consequences.

The problem becomes even more complex in industrial installations. In fact, it is difficult to control the turbulent evolution of a large-volume flame, particularly when using several injectors simultaneously. The great difference in temperature between the core (or inner cone) and the periphery of a large volume flame tends to reduce the quality of combustion and the peripheral exchange of heat. For these reasons, a plurality of burners are used in industrial furnaces. In this case, the volume becomes the limiting factor.

The problem encountered in the present invention is a result of the actual thermal agitation procedure which maintains the incoherence of the reaction medium to an even greater extent, the further the thermodynamic conditions are from the standard state. Therefore, the ruptures of fuel molecules and their behaviour as free particles is completely random. The flame front is the only coherence fringe in the agitated reaction medium. Its propagation in a Brownian medium assumes there is a coherence organising movement preceding it and a decoherence movement following it, both of which generate turbulence which represents lost movement energy.

Depending on their nature, conventional fuels have an average rate of propagation of this undulating coherence space which is associated with a range or extent of compatibility with the frequencies of pulsatory phenomena developed by the reactors. Outside this range of harmonic correspondence, there is destructive interference between the two capacities. Thus, a lower frequency produces unburnt residues and a mediocre yield. Conversely, an excess of pressure in the stream in the burners causes the flame to decay and become unstable. In engines, a high speed therefore leads to knocking, the substance evolving locally, independently of the system.

The heart of the problem lies in the span of the coherence margin between the inherent vibratory properties of the reacted substance and the pulsating and turbulent phenomena developed independently by the reactors. The ideal solution lies in the production of a reactor having coherent, constant, maintained and well controlled pulsatory properties, in full harmony or harmonic with the organised and coherent vibratory behaviour of the substance during the continuity of its transformation, and mainly in the meeting of the reagents.

It is also known that, in a steady stream, the acoustic conditions impose coherence of state and direction on the moving particles. In a nodal region, therefore, the substance is immobile whereas, in the regions containing "bellies", the amplitudes are at a peak and are therefore the same for all points in the vicinity. On the other hand, the oscillating movements of all these points are synchronous and the spacing of these points remains substantially invariable. It is also known from experience that a microscopic steady stream in a pipe conveys the microscopic condition of acoustic pressure (cf. all musical wind instruments).

SUMMARY OF THE INVENTION

The object of the present invention is to provide devices configured to employ the properties of steady streams carrying an acoustic condition so as to construct a reaction system in which all the free particles adopt coherent behaviour subject to the laws of acoustics.

Physicists such as Einstein, Debye, Born, von Karman, Tarassov, etc., who studied the properties of matter, issued the hypothesis of harmonic evolution. However, this cannot be maintained in the case of the Brownian movement which characterises the state of gravity. This is why, as will be explained hereinafter, the means of the present invention aim to develop the forces of Van der Waals interactions which reduce the effects of gravity at the moment of dissociations of matter so that their harmonic coherent conditioning becomes possible.

The devices according to the present invention have the object of creating, on the one hand, coherence and orientation conditions in which dissociated or semi-dissociated species are made to form a coherent orientated stationary field of macroscopic matter comprising phases of pronounced condensation followed by expansion (Bose Einstein condensation) and, on the other hand, conditions for survival of the field conditioned in this way by addition of one or other fields in phase opposition, which compensate for the state of thermodynamic imbalance, the sum of movements of the assembly thus contributing to the formation of a soliton wave having the necessary properties of conservation due to low damping. This conditioning is noteworthy in that said stationary wave has nodal planes which are favourable to the relativistic reinforcement of the kinetic acceleration, which acceleration leads to ionisation of the species which generates a coherent flame and consequently has the characteristics of a laser beam but of which the macroscopic propagation complies with low-frequency stationary behaviour.

The noteworthy consequences are, on the one hand, a better yield per quantity of movement of the ionised field and, on the other hand, a sequence of steady expansions which give rise to successive exchange surfaces which may be used in heat as in pressure.

Furthermore, the present invention also allows simple application allowing the use of reactors of industrial sizes owing to the length of the flame and its isotropy, and may therefore be applied to large furnaces. The absence of oxidation products owing to the complete ionisation is an advantageous consequence for the environment, this advantage allowing numerous types of solid or liquid waste to be treated, virtually without limit, in an inoffensive and economically viable manner, without being limited thereto.

A particular object of the present invention is to overcome the aforementioned drawbacks.

To this end, the present invention relates to a device for producing a plasma by a reaction of combustion of a substance or a mixture of substances M, characterised in that it comprises:

- a resonant chamber of the "Fabry-Perot" cavity type for creating steady circulation of a stream of said substance or substances M penetrating said resonant chamber via at least one supply means and issuing from the resonant chamber in a conditioned form, namely in a coherent and semi-condensed steady vibratory state via at least one outlet in the form of elongate pipe(s),
- an acoustic chamber communicating with said resonant chamber via an orifice and equipped with an acoustic device for generating modulable harmonics, and
- a soliton chamber of adjustable volume for receiving the conditioned substance issuing via the elongate pipe or pipes of the resonant chamber at the same time as it generates recirculation of external air toward this resonant chamber via said elongate pipe or pipes, said soliton chamber being equipped with at least one adjustable flow rate air inlet and said soliton chamber defining, with a pulsating suction member adjacent to the outlet of said soliton chamber, a space for the production of ionised substance.

The invention also relates to a process for ionisation or transformation of the substance employing a device according to the invention, characterised in that it comprises the stages consisting in:

- starting up the pulsating suction member and possibly an ignition aid,
- introducing the substance or substances M to be ionised or to be transformed in the resonant chamber,
- if necessary, initiating conventional preliminary combustion of the previously introduced substance or substances M,
- conditioning the substance or substances M in a coherent and semi-condensed steady vibratory state using the acoustic device and the pulsating suction member,
- after to-ing and fro-ing several times in the resonant chamber, aspirating the conditioned substance or substances M via the elongate pipe or pipes at the outlet of which the wave of the issuing stream of substances M generates a reflection of this incident wave in the form of a reflected wave consisting of a air stream which rises in the elongate pipe or pipes, compensates the negative pressure in the resonant chamber and maintains the reflections between the mirror faces there,
- adding external air to the conditioned substance or substances M issuing from the elongate pipe or pipes via the air inlets situated in the vicinity of the elongate pipe or pipes, and
- ionising the conditioned substance or substances M, optionally using an ignition aid.

The present invention also relates to various applications of the process and to various objects employing the device according to the invention.

BRIEF DESCRIPTION OF THE DRAWINGS

The invention will be understood better by means of the following description which relates to preferred embodiments given as non-limiting examples and explained with reference to the accompanying schematic drawings, in which:

FIGS. 2 to 7, 9, 11 and 12 are views similar to that in FIG. 1 of nine further embodiments of the device according to the present invention.

DESCRIPTION OF THE PREFERRED EMBODIMENTS

Figure 1:
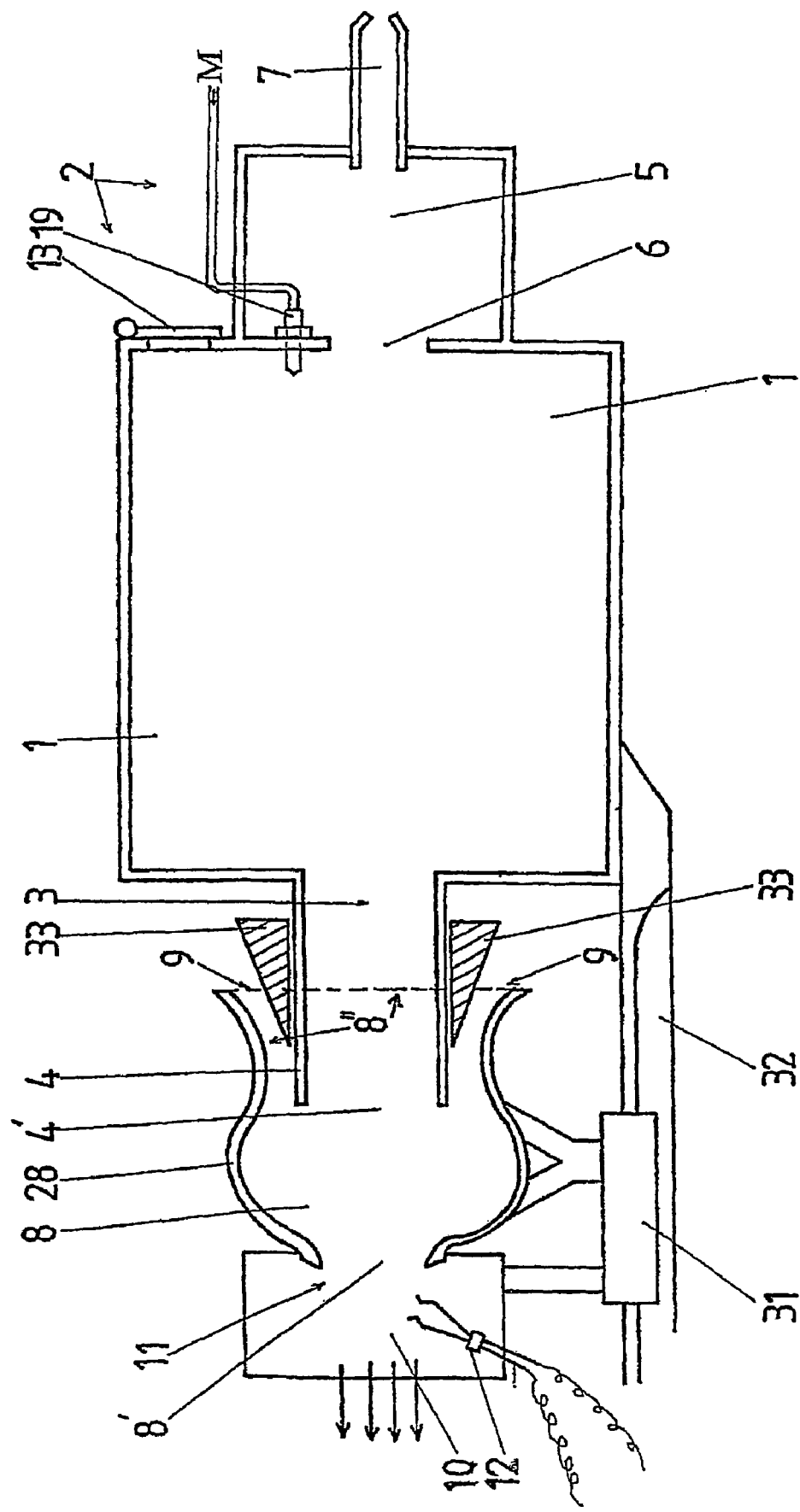
FIG. 1 is a simplified lateral section of the general device of the present invention.

FIG. 1 of the accompanying drawings is a simplified view of the general device of the present invention, in other words a device for producing a plasma by a reaction involving combustion of a substance or a mixture of substances M according to the present invention, which is characterised in that it comprises

- a resonant chamber 1 of the "Fabry-Perot" cavity type for creating steady circulation of a stream of said substance or substances M penetrating said resonant chamber 1 via at least one supply means 2 and issuing from the resonant chamber 1 in a conditioned form, namely in a coherent and semi-condensed steady vibratory state via at least one outlet 3 in the form of elongate pipes 4,
- an acoustic chamber 5 communicating with said resonant chamber 1 via an orifice 6 and equipped with an acoustic device 7 for generating modulable harmonics, and
- a soliton chamber 8 of adjustable volume for receiving the conditioned substance issuing via the elongate pipe or pipes 4 of the resonant chamber 1 at the same time as it generates recirculation of external air toward this resonant chamber 1 via said elongate pipe or pipes 4, said soliton chamber 8 being equipped with at least one adjustable flow rate air inlet 9 and said soliton chamber 8 defining, with a pulsating suction member 10 adjacent to the outlet of said soliton chamber 8, a space 11 for the production of ionised substance.

As shown in FIG. 1, the resonant chamber 1 consists of an elongate cylindrical volume with reflection-generating ends such as a "Fabry-Perot" cavity. This resonant chamber 1 is configured to promote the reflected steady circulation of a saturated stream of conditioned substance(s) M in suspension and to maintain longitudinal vibrations reinforced by the action of the orifice 6 connecting said resonant chamber 1 to the acoustic chamber 5.

The substances M to be conditioned enter the interior of the resonant chamber 1 via one or more supply means 2 and leave it in a conditioned state for the following reaction via at least one outlet 3, for example an outlet 3 produced in the form of a neck.

According to a characteristic of the invention, the means 2 for supplying the resonant chamber 1 with substances M consist of at least one supply opening 13 produced in said resonant chamber 1. An opening toward the bottom of the resonant chamber 1 or at the bottom itself allows the substances M to be introduced or injected, depending on whether they are solid, liquid or gaseous. The various methods of producing the supply means 2 will be described hereinafter.

In the embodiment illustrated in FIG. 1, the conditioned substances issue from the resonant chamber 1 via a single outlet 3 produced in the form of an elongate pipe 4 which is open at its two ends to form a resonator neck. This elongate pipe 4 has a smaller section than the cross-section of the resonant chamber 1 so that the ratio of the cross-sections (impedance factor) is dimensioned to facilitate double circulation created in one direction by the pulsating suction member 10 and in the opposite direction by the depression created by said pulsating suction member 10 in said resonant chamber 1.

The length of the elongate pipe or pipes 4 depends on the arrangements for adjustment of the distance between the end or ends 4' of said elongate pipe or pipes 4 and the first opening 8' of the soliton chamber 8 in which it/they open(s) freely, or else on the configuration of the pulsating suction member 10, providing that the pulsating suction member 10 reverberates with half a wavelength.

According to a characteristics of the invention, the elongate pipe or pipes 4 are of adjustable lengths, for example by being produced in the form of telescopic portions. Other methods of adapting the length of said elongate pipe or pipes 4 are also possible, for example portions connected by extensible bellows. These portions may in fact make it easier to start up the general device according to the invention, to refine the parameters of the adjustments or else to clean the elongate pipe or pipes 4 quickly during operation of said device.

As mentioned hereinbefore and according to a further characteristic of the invention, the section of the elongate pipe or pipes 4 is smaller than that of the resonant chamber 1 and greater than that of a first opening 8' of the soliton chamber 8 connected to the pulsating suction member 10 in such a way that the stream of substances M, which tends to have the section of said first opening 8', leaves at least one annular space for introduction into the elongate pipe or pipes 4 of the reflected wave consisting of the air which is introduced into the soliton chamber 8 via at least one air inlet 9 and rises in said elongate pipe or pipes 4 in the direction of the resonant chamber 1.

According to yet a further characteristic, the natural frequency of the elongate pipe or pipes 4 is selected so as to reverberate at the fundamental frequency of the wave circulating in the resonant chamber 1 and so that the reflected wave directed from the outlet of the elongate pipe or pipes 4 toward the resonant chamber 1 makes up a common mode with the incident wave to promote the beat.

The acoustic chamber 5 consists of an acoustic resonance volume connected tightly via an orifice 6 to the resonant chamber 1 and equipped, on the side remote from this orifice 6, with an adjustable acoustic device. According to a characteristic of the invention, the acoustic device 7 is an acoustic muff or an acoustic reed, for example a device of the variable port flute type or a device having a free reed of which the free space is adjustable.

The size and shape of this acoustic chamber 5 are adapted to the device on which it is provided or to its layout, subject to the distance between the pinch in the region of the orifice 6 and the acoustic member 7, the $n^{th}$ factor of the pulse harmonics attributed relative to the distance between the outlet or outlets 3 of the acoustic member 7.

According to a characteristic of the invention, therefore, the size and shape of the acoustic chamber 5 depend on the distance between said orifice 6 and said acoustic device 7, this distance itself being coordinated with the distance between the outlet or outlets 3 of said resonant chamber 1 and said acoustic device 7.

Advantageously, the distance between said orifice 6 and said acoustic device 7 is a complete sub-multiple of the distance between the outlet or outlets 3 of said resonant chamber 1 and said acoustic device 7.

According to a further characteristic of the invention, the orifice 6, the acoustic device 7 and an outlet 3 of the resonant chamber 1 are aligned.

As shown, in particular, in FIG. 1, the soliton chamber 8 is located between the pulsating suction member 10 and the outlet 3 of the resonant chamber 1.

According to a first embodiment, the soliton chamber 8 has a cylindrical or quasi-cylindrical shape 27 comprising a first opening 8' for connection to the pulsating suction member 10 and a second opening 8" fitting on the elongate pipe or pipes 4 of the resonant chamber 1 so that the space remaining between said second opening 8" and said elongate pipe or pipes 4 forms at least one air inlet 9 for said soliton chamber 8.

According to a second embodiment, the soliton chamber 8 has substantially the shape of a flared bell 28 comprising, on the one hand, a first opening 8' on the enlargement side for connection to the pulsating suction member 10 and, on the other hand, a more or less curved opening 8" fitting on the elongate pipe or pipes 4 of the resonant chamber 1 so that the space remaining between said second opening 8" and said elongate pipe or pipes 4 forms at least one air inlet 9 for said soliton chamber 8.

According to a characteristic of the invention, the second opening 8" of the soliton chamber 8 is extended on the side with the elongate pipe or pipes 4 by a sleeve 29 having a section greater than that of the elongate pipe or pipes 4 and a length equal to half the length of the elongate pipe or pipes 4, said sleeve 29 being positioned stationarily on the free terminal end of said elongate pipe or pipes 4, the free space between said sleeve 29 and said elongate pipe or pipes 4 forming at least one air inlet 9 for said soliton chamber 8.

According to a variation, the second opening 8" of the soliton chamber 8 is extended on the side with the elongate pipe or pipes 4 by a sleeve 29 having a section greater than that of the elongate pipe or pipes 4 and a length equal to half the length of the elongate pipe or pipes 4, said sleeve 29 being positioned movably on the free terminal end of said elongate pipe or pipes 4, the free space between said sleeve 29 and said elongate pipe or pipes 4 forming at least one air inlet 9 for said soliton chamber 8 and the second more or less curved opening 8" of the soliton chamber 8 sliding with friction on said sleeve 29.

According to a further particularly important characteristic, the soliton chamber 8 is movable relative to the resonant chamber 1.

Advantageously, the pulsating suction member 10 is movable relative to the soliton chamber 8, the space between said soliton chamber 8 and said pulsating suction member 10 forming a part of a variable-port flow rate accelerator 30.

As will be explained in more detail hereinafter, the device according to the invention is also characterised in that the resonant chamber 1, the soliton chamber 8 and/or the pulsating suction member 10 are mounted on one or more carriages 31 which travel along at least one rail 32.

According to a further characteristic, the device according to the invention comprises a means for forming an orientated tangential rotational circular suction movement which generates toroidal acceleration of the flux passing through the flow rate accelerator 30.

The elongate pipe or pipes 4 of the resonant chamber 1 have, on their external peripheries, elements 33 having an external surface which increases in the direction of the resonant chamber 1 so that the space between the walls of the second opening 8" or those of its extension by the sleeve 29 and the external surface of said elements 33 decreases when said second opening 8" or said sleeve 29 approaches said elements 33, thus allowing regulation of the air flow rate entering the air inlets 9.

Preferably, the external surface of the elements 33 has a shape mating with that of the second more or less curved opening 8" or that of the sleeve 29.

In a variation, the elements 33 are mounted movably on the elongate pipe or pipes 4, for example by sliding or rotation round a helical screw.

The depth of nesting of the second opening 8", optionally extended by the sleeve 29, on the elongate pipe or pipes 4 may be adjusted via the displacement of the soliton chamber 8, the sleeve 29 and/or the elements 33 in order to check the ionisation reaction of the substance or substances M, the variation in the depth of said nesting allowing the phase state of the air entering via the air inlets 9 to be adapted so that said air stream is in phase opposition to the stream of substances M extracted from the resonant chamber 1.

FIG. 1 of the accompanying drawings shows a simplified non-limiting embodiment of a device according to the invention in which the soliton chamber 8 in which the ovoidal soliton chamber 8 comprises a first opening 8' (enlargement side) for connecting said soliton chamber 8 tightly to the pulsating suction member 10 and a second opening 8" (tapered side) located remotely from the first opening 8'.

The soliton chamber 8 illustrated is connected to the external atmosphere by one or more air inlets 9 and has mainly two functions, namely, on the one hand, to receive the outlet 3 of the resonant chamber 1 which penetrates more or less deeply via the elongate conduit 4 into the interior of the soliton chamber 8, the adjustment of the distance between the outlet 3 (or the end 4' of the elongate pipe 4) and the first opening 8' of said soliton chamber 8 allowing the reaction to be adjusted and checked by acting on the position of the carriage 31 on the rail 32 and, on the other hand, owing to the air inlets 9, to bring about the entry of an air stream in the state of phase opposition relative to the stream extracted from the resonant chamber 1.

The soliton chamber 8 is configured in such a way that the adjustable intake of the air inlets 9 is necessarily and permanently located in the region of a nodal plane of the device such as, for example, a nodal plane of the elongate pipe 4 which reverberates in a half wavelength, one of the nodal planes of one of the resonant chambers 1 or acoustic chambers 5, etc.

According to a variation, the air inlet 9 via the second opening 8" of the soliton chamber 8 is supplied in a tight manner by at least one pipe which originates at one of the nodal points of the device.

The quantity of air entering the soliton chamber 8 via the air inlets 9 must allow the soliton recirculation via the elongate pipe 4 to compensate and check the depression prevailing in the resonant chamber 1.

The rail 32 supports the carriage 31 of which the lateral displacement allows adjustment of the distance between the outlet of the soliton chamber 8 in the region of the first opening 8' and the end 4' of the elongate pipe 4. The rail 32 may be connected to the resonant chamber 1, the soliton chamber 8 associated with the pulsating suction member 10 being fixed on the carriage 31 which slides laterally on said rail 32.

In a variation, the rail 32 is connected to the associated pulsating suction member 10 and the soliton chamber 8 and the resonant chamber 1 is movably fixed on a carriage 31.

According to a further characteristic, the device according to the present invention is characterised in that it also comprises at least one ignition aid 12 for the conditioned substance or substances M in the space 11 of the soliton chamber 8.

Any static or mechanical device capable of causing suction in pulsating conditions, equipped or not equipped with an ignition aid 12, is capable of being coupled to the first opening 8' of the soliton chamber 8 in order to activate the device according to the invention employing the process for transformation of the substance, forming a further object of the present invention.

Suitable pulsating suction members 10 include, by way of non-limiting examples, static devices (static smoke duct 34, a set of deflectors 35 of a pulse-jet 36), mechanical devices (variable port flow-rate accelerator 30 actuated by a fan-type device or a blowing turbine 37, a gas turbine 38 of which the first blade 39, attached to the first opening 8' of the soliton chamber 8, produces pulsating suction, an internal-combustion engine 41, 42 or mixed devices (ram jet)).

In the case of an internal-combustion engine 41, 42, the ignition aid 12 for the conditioned substance M in the space 11 will preferably be that of the internal-combustion engine 41, 42.

The operating principle of the general device according to the invention (FIG. 1) is as follows:

The first opening 8' of the soliton chamber 8 is connected to one or more pulsating suction members 10 equipped, if necessary, with their own ignition means or ignition aids 12 (comprising, for example, electrodes or spark plugs) and equipped with a flow rate adjustment means. The pulsating suction member 10 is then started up (including, if necessary, its ignition aid 12) and the substance or substances M are introduced into the resonant chamber 1 via the supply means 2. The substance or the mixture of substances M is conditioned in the form of a field of substances (cloud or mist) in a coherence and semi-condensed steady vibratory state.

After a plurality of to-ing and fro-ing movements in the resonant chamber 1, the field of substances is aspirated through the outlet 3 in the elongate pipe 4 and added to the air stream penetrating from the exterior via the air inlets 9 into the soliton chamber 8. The contracting field of substances then arrives at the first opening 8' of the soliton chamber 8 where, after addition to the air stream, it is subjected to a pulse of velocity. This velocity, increased locally by the vacuum caused by the ignition means or ignition aid 12, leads to general ionisation of the accelerated field. The velocity belly of the ionised field creates a vacuum in line with the first opening 8' which is responsible for an increase in the velocity and therefore ionises all the substances passing through this first opening 8'.

The igniter or the ignition aid 12 which have become useless are extinguished, the acceleration reaction being continued by maintaining the flame, providing that the resonant chamber 1 is ensured of a supply of substances M.

To facilitate ignition, the adjustment of the acoustic device 7 is completely opened. The flow rate accelerator 30 is adjusted to the lowest in correlation with the flow rate of air due to the widely open air inlets 9 of the soliton chamber 8 and with the flow rate through the first opening 8' directed toward the end 4' of the elongate pipe 4. As soon as the substance appears in the form of mist in the region of the first opening 8', the passage of air into the acoustic device 7 is progressively closed so as progressively to increase the intensity of the depression simultaneously with establishment of the pulsating regime.

The progress of the radiating flame is followed by appropriate controls such as adjustment of the acoustic device 7 toward its minimum operating point, the increase in the distance between the first opening 8' and the end 4 of the elongate pipe 4, the adjustment of the flow rate of the air inlets 9 and the increase in power of the pulsating suction member 10 until the correct flow rate corresponding to the velocity of conditioning in the resonant chamber 1 is established.

In fact, if the stream velocity in the region of the flow rate accelerator 30 or venturi is too slow relative to the conditioning velocity in the resonant chamber 1, the field of particles is saturated and heavier, the inadequate velocity pulse in the region of the first opening 8' revealing unburnt $C_xH_y$ when checked.

If, on the other hand, the depression applied by said venturi is too high or the air inlet is too restricted, the reinforcement of the contraction amplitudes due to the release of hydrogen is poorly compensated and the piezo-electricity is observed by the appearance of $SO_2$ and nitrogen oxides $NO_x$. The defect may be due solely to a deficit in oxygen (measured in the waste) attributable, in this case, to the opening of the air inlets 9 and to the force applied by the venturi, which must remain sufficiently strong to promote the reflection of the waves in the form of a recirculation capable of compensating the depression in the resonant chamber 1.

Once the substance M has been introduced into the resonant chamber 1 and suspended, it is subjected to the vibratory state and circulates from the centre in a route induced by the acoustic conditions as described in detail hereinafter.

The pulsating suction due to the pulsating suction member 10 which is transmitted successively from the first opening 8' to the soliton chamber 8, to the elongate pipe 4 and to the resonant chamber 1 causes the propagation of a circulating steady movement which conditions the atmosphere of this resonant chamber 1.

The suction transmitted by the elongate pipe 4 creates, in the region of the opposing wall, a depression which is retransmitted to the end 4' of the elongate pipe 4 in the soliton chamber 8 where it is again reflected in the direction opposed to the pressure transmitted by the recirculating air stream which compensates the depression initially created in the resonant chamber 1. Then, this reflected wave abuts again against the back remote from the elongate pipe 4.

The resonant chamber 1, such as a "Fabry-Perot" cavity, maintains multiple reflections of this circulation of the gas or mist formed by the saturation of the species in suspension, said reflections being promoted by the impedance resulting from the ratio of the cross-sections between the elongate pipe 4 and said resonant chamber 1.

The incident depression is reflected by the walls of the resonant chamber 1, except in the region of the orifice 6, where it is transmitted to the acoustic chamber 5 up to the acoustic device 7 where it comes into contact with the external atmosphere at standard pressure. The atmospheric pressure then attempts to re-establish the equilibrium in the acoustic chamber 5 by introducing a pressure which, on passing, activates the acoustic device 7 which becomes resonant.

The vibrations of the acoustic device 7 are maintained by the pulsation of the resonant chamber 1 which is itself maintained by the suction originating from the pulsating suction member 10 via the elongate pipe 4. It is as though the pulsation maintained between the elongate pipe 4 and the acoustic device 7 corresponded to a cord pinched in the region of the orifice 6. The macroscopic pulsation of the resonant chamber 1 therefore conveys the microscopic vibrations reflected as a result of the pinching in the region of the orifice 6 in the form of high frequency harmonics resulting from its inherent action on the acoustic chamber 5, similarly to the circulation of an air stream which conveys the sound produced by the mouthpiece of a musical wind instrument.

The steady stream circulating in the resonant chamber 1 therefore conveys, in its core, high frequency acoustic vibrations of which the coherent oscillation are harmonics of the general macroscopic pulsation. The movements of the particles conveyed by this stream are therefore coherent in position and direction as in a general steady movement in which the pressurisation $\Delta P_B$ resulting from the application of velocity u is:

$$\Delta P_B = \tfrac{1}{2} p_0 . u^2 \text{(Bemoulli's Law)}$$

wherein $P_B$ represents the pressure in a conventional stream, $p_0$ represents the density and u the acoustic velocity, in other words the velocity of the particle as it passes the disturbance.

It is known that the acoustic pressure $\Delta P_A$ is otherwise higher than that resulting from a steady relaxation or compression of a conventional stream at the same velocity.

$$\text{When } M = \frac{u}{Co} \cdot \text{(Mach number)}$$

wherein Co=velocity of sound in the (gaseous) medium under consideration and knowing that the acoustic pressure $\Delta P_A$ resulting from a same velocity take-up is: $\Delta P_A = p_0.Co.u$, we have:

$$\Delta P_A/\Delta P_B = 2Co/u = 2/M$$

When M=0.005, this ratio is 40, in other words the acoustic pressure is 40 times higher than that resulting from a steady relaxation or compression at the same velocity.

As the atmosphere of the resonant chamber 1 subjected to the suction of the pulsating suction member 10 is kept in a depressed state, the acoustic pressure pulsations are absorbed by this state. On the other hand, the contracting pulsations instantaneously increase the depression in the resonant chamber 1, are reinforced and tend to produce a beating effect which stresses the entire volume of resonant chamber 1. All the particles or groups of particles present in the form of aggregates in suspension and which are subjected to these harmonic pulsations oriented in the contraction direction adopt a precession movement and tend to condense. Due to this effect and the beating effect, their behaviour becomes coherent with the phase of the steady stream conveying them, in direction and in position. The coherence, the general directional orientation and the reinforcement of the mass of the aggregates after contraction depend on absorption of the energy of the medium, in particular of the heat required for the instantaneous stabilisation and the development of the Van der Waals forces which prevail over the other interactions and give the particle field its independence from the surrounding gravitational state.

As the atmosphere of the resonant chamber 1 is only supplied with air via the acoustic device 7 and by the recirculation or reflux originating from the elongate pipe 4 in a steady manner, it is important to check the pressure of the resonant chamber 1 so that the transformation conditions remain as reducing conditions while maintaining a pressure of which the value is very close to atmospheric pressure.

In fact, the breakages of the molecular bonds release hydrogen atoms which absorb a large quantity of heat and evolve to the gaseous state. This process markedly reinforces the contraction amplitudes and leads to crystallisation of aggregate which generates coherence-destroying piezoelectric effects if the initial depression is too great.

The soliton chamber 8 equipped with the air inlets 9 has to act as a regulator by influencing two parameters, namely the suction force of the pulsating suction member 10 on the elongate pipe or pipes 4 which may be modulated by supplying a volume of air to the field of aspirated substance in the region of the first opening 8' and, on the other hand, the depression created by the stream extracted from the resonant chamber 1 which may be compensated by a recirculation or reflux of air transmitted to the resonant chamber 1 by the elongate pipe or pipes 4 configured so as to maintain the depression of the resonant chamber 1 close to the standard external pressure.

As the conditions of coherence and substance field state have been created in this way, the substance field is aspirated through the outlet or outlets 3 after having circulated in the resonant chamber 1. As the cross-section of the elongate pipe or pipes 4 is small relative to the cross-section of the resonant chamber 1, the range of contraction is increased to this extent and has repercussions on the following phase of contraction at the passage from the first opening 8' of the connection of the soliton chamber 8 to the pulsating suction member 10.

The passage formed by the first opening 8' forms a velocity "node" where the theoretically immobile particles do not exceed the average velocity of the stream. On the other hand, the variations in pressure are at a maximum there, and this tends to increase the charge potential conveyed by the field of substance at this point. For the dipolar acceleration (consequence of the passage at the "node" at the first opening 8') to lead to a disruption, a carrier of opposing charge is required.

The air stream added to the substance field therefore has to meet certain conditions of orientation, movement and evolution in the direction opposed to the conditions of the substance field and must be in phase opposition. It is known that there is a velocity "belly" in the region of the external air inlets 9 into the soliton chamber 8. If this air admission point is located in the region of 0.5 the intermediate "node" of the elongate pipe or pipes 4 reverberating in a half wave, the parallel circulations oriented in the same direction toward the first opening 8' are in phase opposition as is the air dispensed by the pulsating suction member 10 or owing to the flow rate accelerator 30.

The introduced air is therefore in a pressure state opposed to the state of contraction of the stream of substance in the region of said first opening 8', thus meeting the condition of dipolar accelerating couple.

In the expansion following the nodal plane (located in the region of the first opening 8') of relativistic velocity pulse, the disruptive effects depend on the moving mass. If the density of the aggregates is sufficient, ionisation does not necessitate and additional acceleration factor: ignition is immediate in the region of the pulsating suction member 10.

On the other hand, if the charge density is inadequate, an increase in velocity is essential. Experience shows that a limited series of sparks from a spark plug or electrodes at any point close to the expansion space 11 located after the first opening 8' in the region of the pulsating suction member 10 is sufficient to cause total and permanent ionisation of the entire substance field passing through the nodal space existing in the region of the first opening 8'.

After ignition and stabilisation of the flame, the ignition aid 12 is extinguished. The reaction therefore continues for as long as the supply by the supply means 2 of the resonant chamber 1 is not interrupted.

The coherence of the flame, which is a reflection of that of the substance field, is that of a laser beam with a low propagation frequency, of which the colour depends on the frequency and the effectiveness of the beat of the harmonic generated by the acoustic chamber S. All the expansion movement energy of the field of substances ionised by the acceleration becomes available.

Depending on the characteristics of the pulsating suction member 10, the quantity of movement is damped in the form of heat yielded to an exchanger which is all the more effective if it receives a plurality of phases of the continuing steady expansion movement.

In a further embodiment, the quantity of movement confined in the space 11 becomes a pressure force applicable to a piston or to the blades of a turbine. It is also possible to store this energy in the form of "noble" substance using devices of the soliton chamber 8, of the elongate pipe or pipes 4 and of the chamber 1 which lead to the condensation of the substance field.

If the substance or substances M used exhibit treatment inertia after stoppage of the supply, it is merely necessary to reduce the suction of the pulsating suction member 10 and appropriately to adjust the position of the elements 33, the opening of the air inlets 9 and the position of the carriage 31 so that the reaction diminishes progressively until it completely stops.

Some preferred variations of the device according to the invention will be described hereinafter as non-limiting examples.

Figure 4:
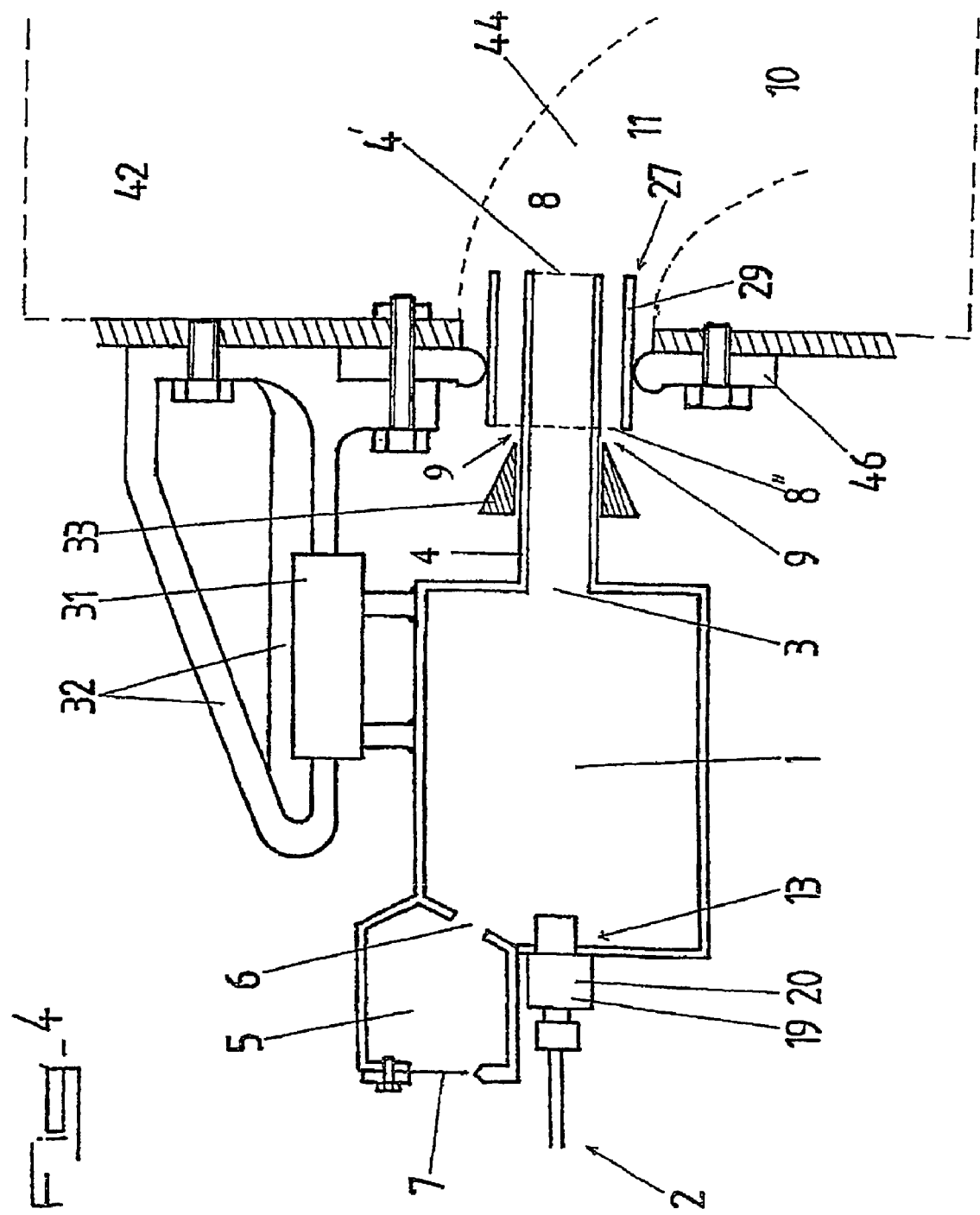
Figure 5:
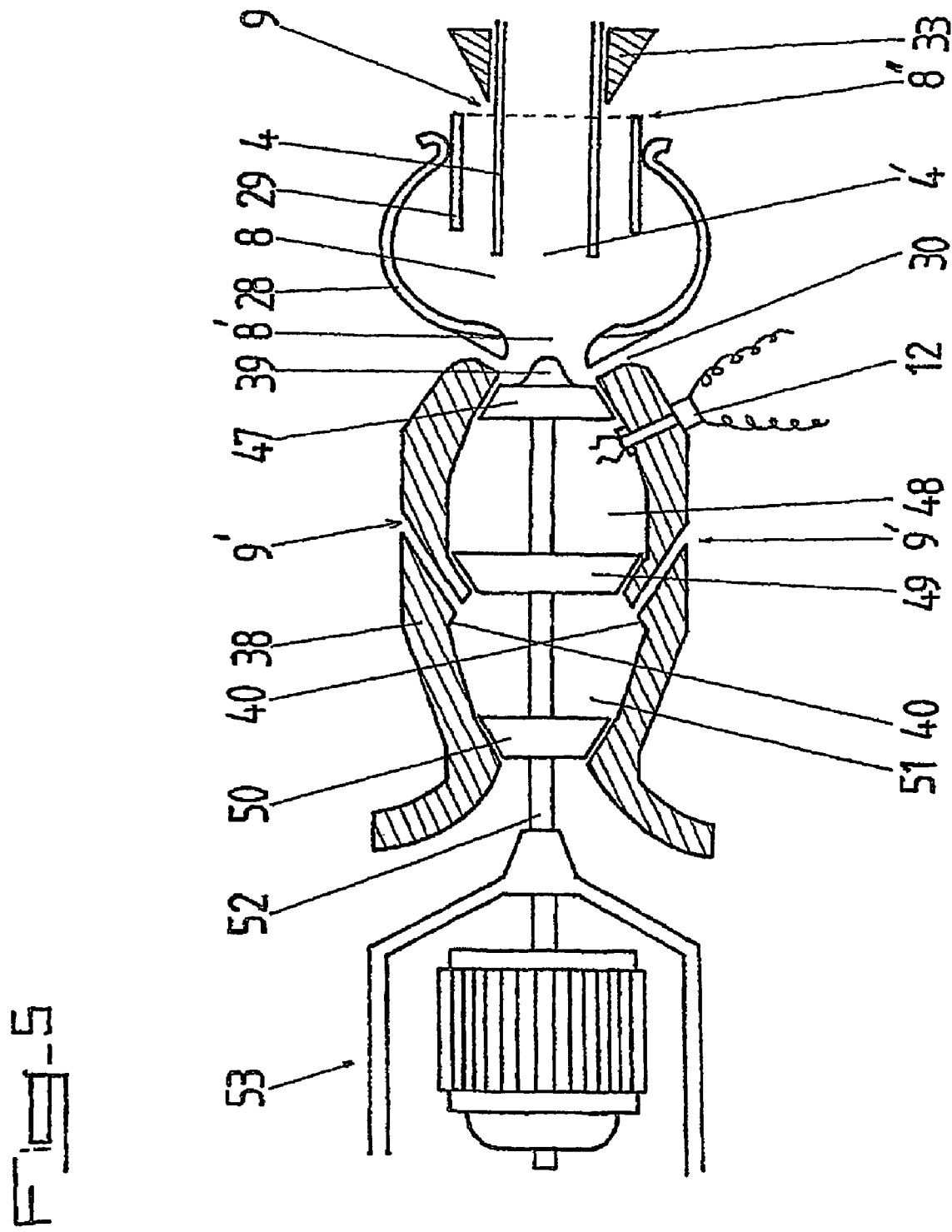
Figure 6:
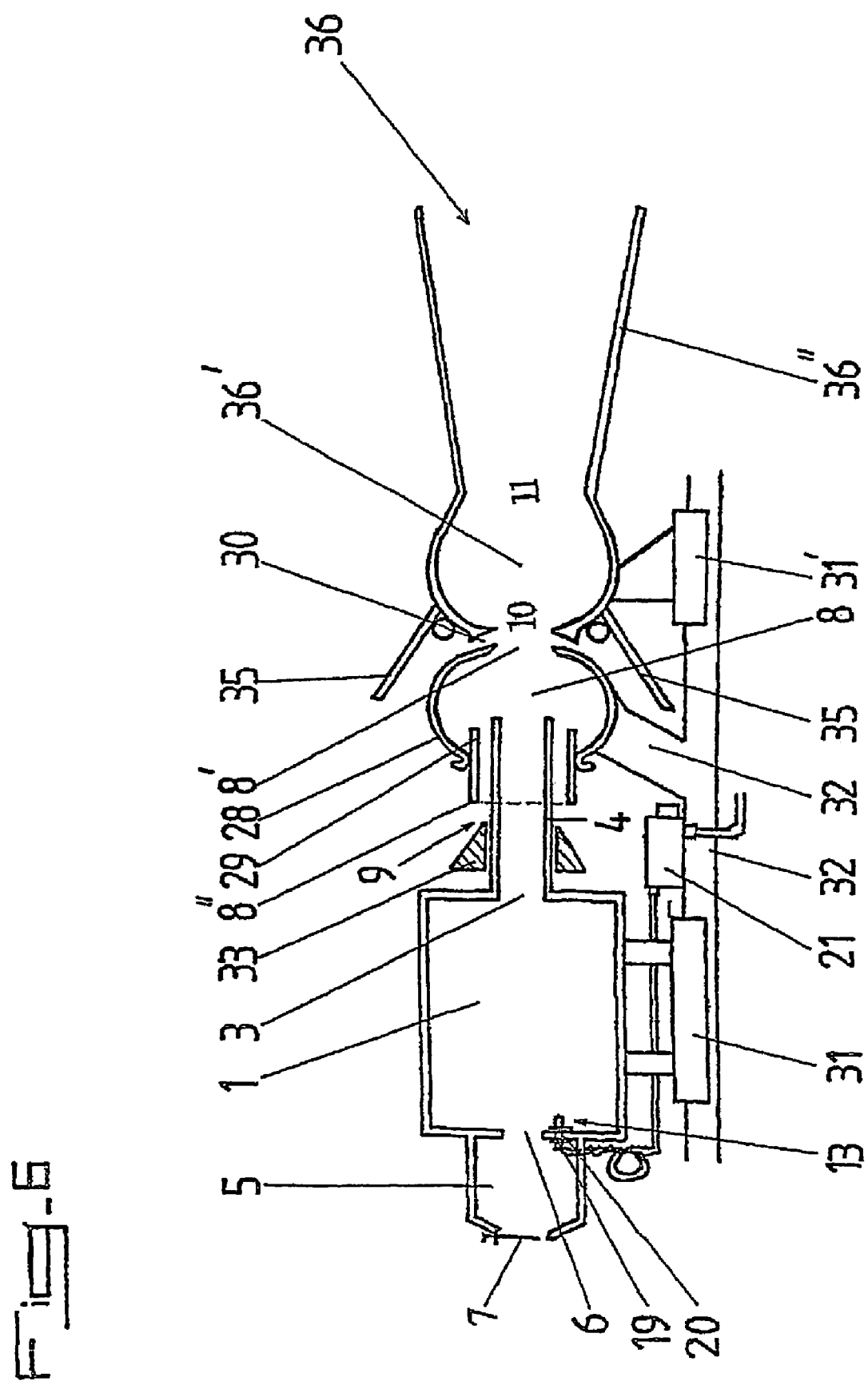

FIGS. 2 to 6 show devices according to the invention which are mechanically activated by mixed liquid and gas burners (FIG. 2), a four-stroke internal-combustion engine (FIG. 3), a two-stroke internal-combustion engine (FIG. 4), a turbine in an industrial version (FIG. 5) and a pulse jet (FIG. 6).

Figure 2:
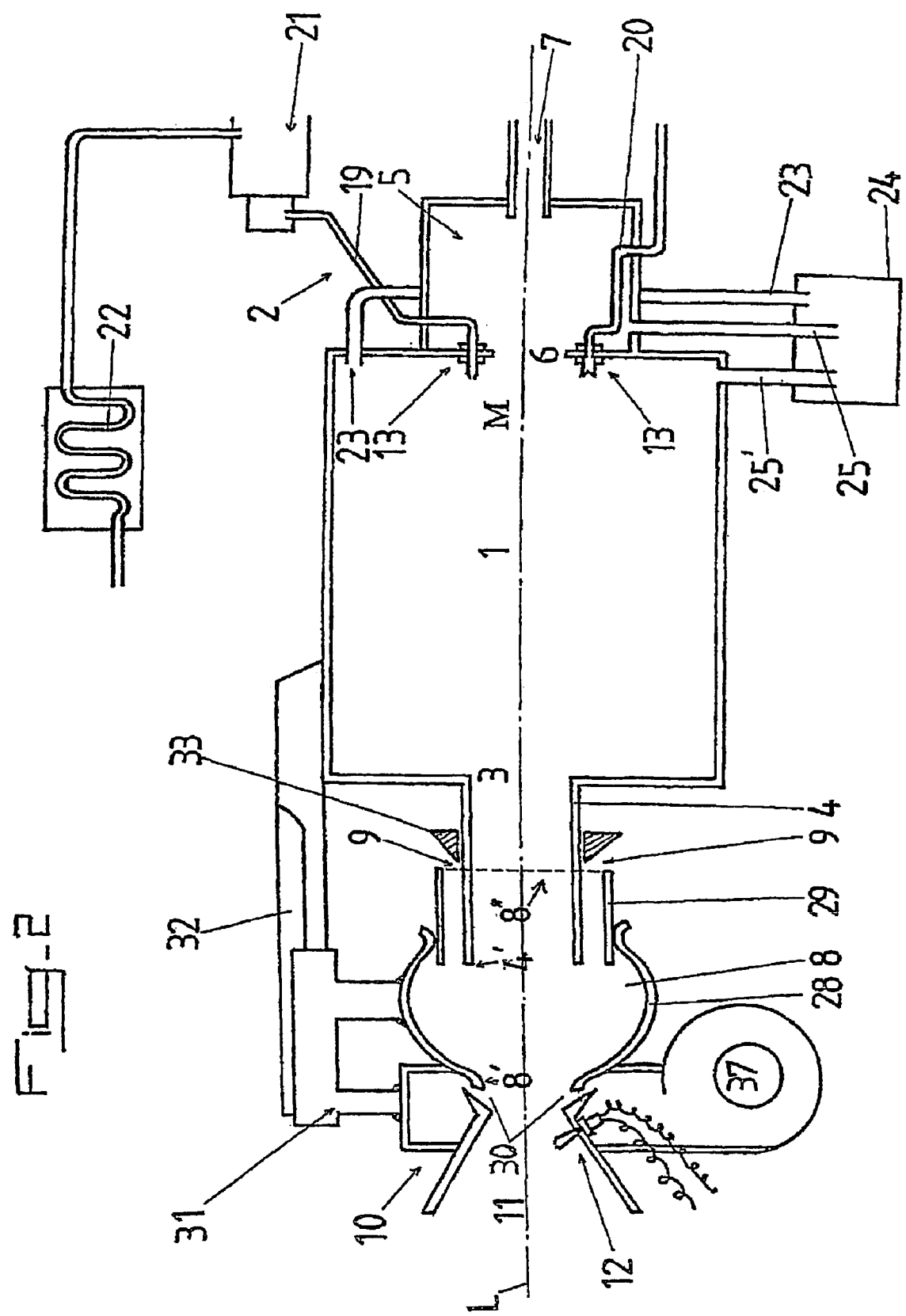

FIG. 2 of the accompanying drawings illustrates a device according to the invention which is configured for the use of liquids and gases, whatever their viscosity and whatever the size, whether domestic or industrial, of said device.

As can be seen in this figure, this variation of the general device of FIG. 1 is configured to use liquids and/or gases selectively or simultaneously by specific means adapted to the gaseous and liquid (fluid or viscous) states. The resonant chamber 1 equipped, in particular, with the supply means 2, the elongate pipe 4 and the orifice 6 is provided with collecting means 24 and/or discharge means 25, 25', depending on the applications, and with a vent 23.

A sleeve 29 intended to facilitate adjustment of the soliton chamber 8 is fixed on the elongate pipe 4 of the resonant chamber 1 so as to keep the air supply inlet 9 in the region of the nodal plane of the elongate pipe 4, regardless of the position of the first opening 8' of said soliton chamber 8 relative to the end 4' of the elongate pipe. Said sleeve 29 creates, between itself and the external face of the elongate pipe 4, a passage for the air entering through the air inlets 9.

The acoustic chamber 5 is equipped with an acoustic device 7 (acoustic muff or reed) and is connected tightly via the orifice 7 to the resonant chamber 1.

According to a characteristic of the invention, the supply means 2 consist of one or more injectors and/or nebulisers 19, 20 for the substance or substances M, which may optionally have been previously treated in order to obtain a presentation appropriate for said injectors and/or nebulisers 19, 20.

The injectors and/or nebulisers 19, 20 may advantageously comprise heaters 22 for the substances M intended to supply the resonant chamber 1.

As may be seen, in particular, in FIG. 2, the means 2 supplying the resonant chamber 1 with substances M may consist either of one or more gas injection nozzles or of one or more liquid injectors supplied by an additionally heated variable flow rate injection pump 21 or else by a mixed coupling of these two sources of supply.

According to a further characteristic, the resonant chamber 1 and/or the acoustic chamber 5 and/or the soliton chamber 8 and/or the elongate pipes 4 are also provided with one or more collecting means 24 and/or discharge means 25, 25' for overflow rates, residues and/or combustion condensates produced, wherein said collecting means 24 and/or discharge means 25, 25' may be provided with vents 23, thermal protection and/or cooling and/or confinement means.

In the preferred embodiment illustrated, the collecting means 24 are disposed below and in the vicinity of the orifice 6 of the acoustic chamber 5.

The discharge means 25, 25' for the overflow or for a saturation of the resonant chamber 1 may consist of tubes and may be connected to a common collecting means 24 or reservoir which is sealed from the external air and equipped with a vent 23 opening, for example, into the resonant chamber 1 or the acoustic chamber 5.

The soliton chamber 8 located in the longitudinal axis L of the device according to the invention and mating with the end 4' of the elongate pipe 4 is fixed to a moving support produced in the form of a carriage 31 sliding on the fixed support which is itself produced in the form of one or more rails 32 connected to the resonant chamber 1.

The sleeve 29 may be displaced by sliding with friction in a direction parallel to the longitudinal axis L, thus displacing the air inlets 9 relative to the elements 33 fixed on the elongate pipe 4. This allows adjustment of the distance between the first opening 8' of this soliton chamber 8 and the end 4' of the elongate pipe 4, the space between the sleeve 29 and the elongate pipe 4 serving as a means of communication with the exterior of which the cross-section may be checked by the element or elements 33 produced, for example, in the form of a conical sleeve which may be adjusted by sliding or by helical rotation on said elongate pipe 4.

A flow rate accelerator 30, also known hereinafter as variable flow rate venturi of the pulsating suction member 10 attached tightly to the first opening 8' of the soliton chamber 8 may also be fixed to the common support or carriage 31.

As shown in FIG. 2, this venturi may be supplied by a fan or blowing turbine 37 and its divergent portion may be equipped with an ignition aid 12, for example with a spark plug or electrodes.

The rail or rails 32 acting as support means connected to the resonant chamber 1 may advantageously comprise a device (not shown) for adjusting the first opening 8' and end 4' course between the soliton chamber 8 and the elongate pipe 4.

The device shown in FIG. 2 operates in the following manner: the flow rate accelerator 30 or venturi is started up by actuating the source of air originating from the blowing turbine 37. The combustible substance or substances M optionally heated by the heater 22 are injected into the resonant chamber 1 by the injectors and/or nebulisers 19, 20.

Advantageously, the gases are injected by traditional low pressure nozzles whereas the pressures for injection of the liquids (proportional to their density) remain within conventionally used values owing to the contraction used for their conditioning.

If the supply to the resonant chamber 1 is mixed, for example made up of a mixture of gas and fuel, it is easier to initiate the reaction first with the gas, without this being an obligation.

Similarly, the use of heave fuel or contaminated oils is greatly facilitated if the gas or again the petrol are used first or together with the substances of average or high viscosity. The fuel facilitating start-up may then be stopped.

The gases and liquids sprayed or atomised by the injection pressure are conditioned by the vibratory circulation conditions of the resonant chamber 1 and arrive in the form of mist in the elongate pipe 4, aspirated by the checked effect of the soliton chamber 8.

When the substance field is in the region of the venturi, it is ignited by the spark plug or the electrode of the ignition aid 12.

A device according to the invention intended for domestic use may be preadjusted and calibrated once and for all and it is merely necessary to adjust the flow rate and the adaptation to the medium. According to a variation which is particularly suitable for domestic use, the soliton chamber 8 is connected tightly to the elongate pipe 4, and the external air inlet 9 is produced in the form of a tube penetrating to the interior of the elongate pipe 4 and originating at the nodal plane of the pipe 4 or else at one of the nodal planes of the device, so as to distribute the air in the region of the end 4' of this elongate pipe 4.

For devices according to the invention of industrial size or for the treatment of heavy oils, the increase in power is more progressive and it is essential to follow the increase in charge so as to avoid the release of smoke on ignition.

Ignition using the venturi is always carried out first of all by means of the ignition aid 12 under conditions of minimum velocity adjustment, in other words with the acoustic device 7 open, the distance between first opening 8' and outlet 3 reduced, the air inlets 9 open with a safety margin and the flow rate accelerator 30 operating at reduced velocity. Once the reaction has been initiated, the progress of the reaction in the liquid systems is rapid, so the appropriate adjustments of the injection flow rates, of the acoustic device 7 to its minimum point, of increasing the distance between first opening 8' and outlet 3 (or end 4'), of reducing or increasing the cross-sections of the air inlets 9 and of increasing the power of the venturi may be carried out immediately until the correct flow rate corresponding to the rate of conditioning of the substances M in the resonant chamber 1 is established.

In fact, if the flow rate at the venturi is too slow relative to the conditioning rate in the resonant chamber 1, the particle field will be saturated and heavier, and the inadequate velocity pulse in the region of the first opening 8' will then allow unburnt $C_xH_y$ to appear. If, on the other hand, the depression applied by the venturi is too high or if the air inlet 9 is too restricted, the increase in the contraction ranges due to the release of hydrogen is poorly compensated and the piezoelectricity is manifested by the appearance of $SO_2$ and nitrogen oxides $NO_x$. The defect may be the mere lack of oxygen measured in the waste. In this case, it is attributable to the opening of the air inlets 9 and to the force applied by the venturi, which must remain strong enough to promote the reflection of the wave in the form of recirculation in the elongate pipe or pipes 4 of the air arriving in the soliton chamber 8.

As soon as the flame is stabilised, ignition by the ignition aid 12 is stopped. The adjustments may be automated, for example by using sensors to monitor parameters recorded at strategic points of the device and by using computer programmes for processing.

The gases and the relatively fluid liquids (viscosity comparable to that of domestic fuel or of certain low-density refined oils) are easy to use because they are already in simple molecular form like gases or are in the form of fine droplets in the case of the liquids sprayed by the injectors. They are sensitive to vibrations and condense easily, a greater degree of freedom allowing fast conditioning in small resonant chambers 1 in which the velocities of the steady stream are high, leading to the occurrence of higher frequency pulses.

It is not necessary to bring about finer dissociation in the resonant chamber 1 by initiating a conventional combustion reaction. The ruptures of the dihydrogen molecules take place at the moment of final contraction before the passage of the nodal plane of the first opening 8' checked as described hereinbefore. The initial ionisation or ignition of the substance field necessitates only local acceleration by sparks from the ignition aid 12 which is then stopped.

Once the substance has been ionised, the high kinetic velocities of expansion create the accelerating vacuum in the region of the nodal plane of the first opening 8'. The first injections of domestic fuel may advantageously be heated for initial ignition.

Afterward, the increase in the amplitude due to the vacuum created by ionisation in the nodal plane of the first opening 8' is sufficient to maintain the reaction. From a certain density of the substances used, the means for regulating the forces applied by the pulsating suction member 10 combined with the devices for adjusting the distance between the first opening 8' and the end 4' are capable of causing ionising acceleration without the need for initial electronic ignition.

The slower viscous fluids run the risk of not responding to the stress of the beat at the frequency imposed by a small resonant chamber 1 unless they are conditioned in a very precise and much more onerous manner. There is therefore a critical dimension for the route of the steady stream as a function of the connecting forces present in the substance or substances M used. The ideal conditioning is achieved by circulating a group of particles subjected to multiple wave reflections. The heavy or contaminated oils therefore depend on a size of the resonant chamber 1 which is adapted to their degree of freedom and on being heated continuously to a minimum temperature of about 70° C. so as to have the viscosity required for sufficiently fine spraying without attaining the state of the aerosol which would condense small particles and would therefore require an increase in the number of contractions and condensations for obtaining aggregates carrying a potential of significant charge.

The flame resulting from the use of the device according to the invention is equivalent to a laser beam which would pulsate at low frequency. It has its coherence and property of continuity linked to the macroscopic soliton wave system, even in large industrial devices.

It is known that the wavelength of the ionised field depends on the value of the velocity pulse at the nodal plane of the first opening 8' added to the charge carrying mass of the aggregates. Starting with an established flame, it is possible to increase the power of the venturi effect by referring to the $SO_2$, $O_2$ and $CO_2$ contents of the gases emitted and making the necessary corrections (by acting on the air inlets 9 and the carriage 31 of the soliton chamber 8) and checking the recirculation. On the other hand, the acoustic passage existing in the region of the acoustic device 7 which supplies oxygen and tends to promote thermal agitation locally must not be forced.

Depending on the size of the resonant chamber 1, the flow rate and the fineness of spraying, wall effects are not ruled out and may cause precipitation of liquid located in the bottom of the resonant chamber 1 as well as condensation in the acoustic chamber 5 owing to the external air stream of the acoustic device 7. To prevent an accumulation in these chambers, discharge means 25, 25' which do not modify the atmosphere of these chambers are connected to at least one collecting means 24 which is sealed from the external air and is preferably equipped with a vent 23 which turns back into the resonant chamber 1 or the acoustic chamber 5.

The advantages of this embodiment lie in the flexibility of the mixed or successive use of different fuels such as gas and fuel in domestic heating devices as well as in the ease of use of heavy or contaminated oils which are difficult to eliminate without risk. The quantity of heat transmitted through the ionised field is greater than that of a conventional flame owing to the steady evolution which generates a succession of bellies of expansions increasing the heat exchange surfaces.

Furthermore, the coherence of the large flame allows the use of large capacity furnaces which limit the loss by the use of a single heat source of great length.

The quality of the emission which do not pollute the environment owing to the absence of oxidation means that these devices are quite suitable for urban and industrial use.

Figure 3:
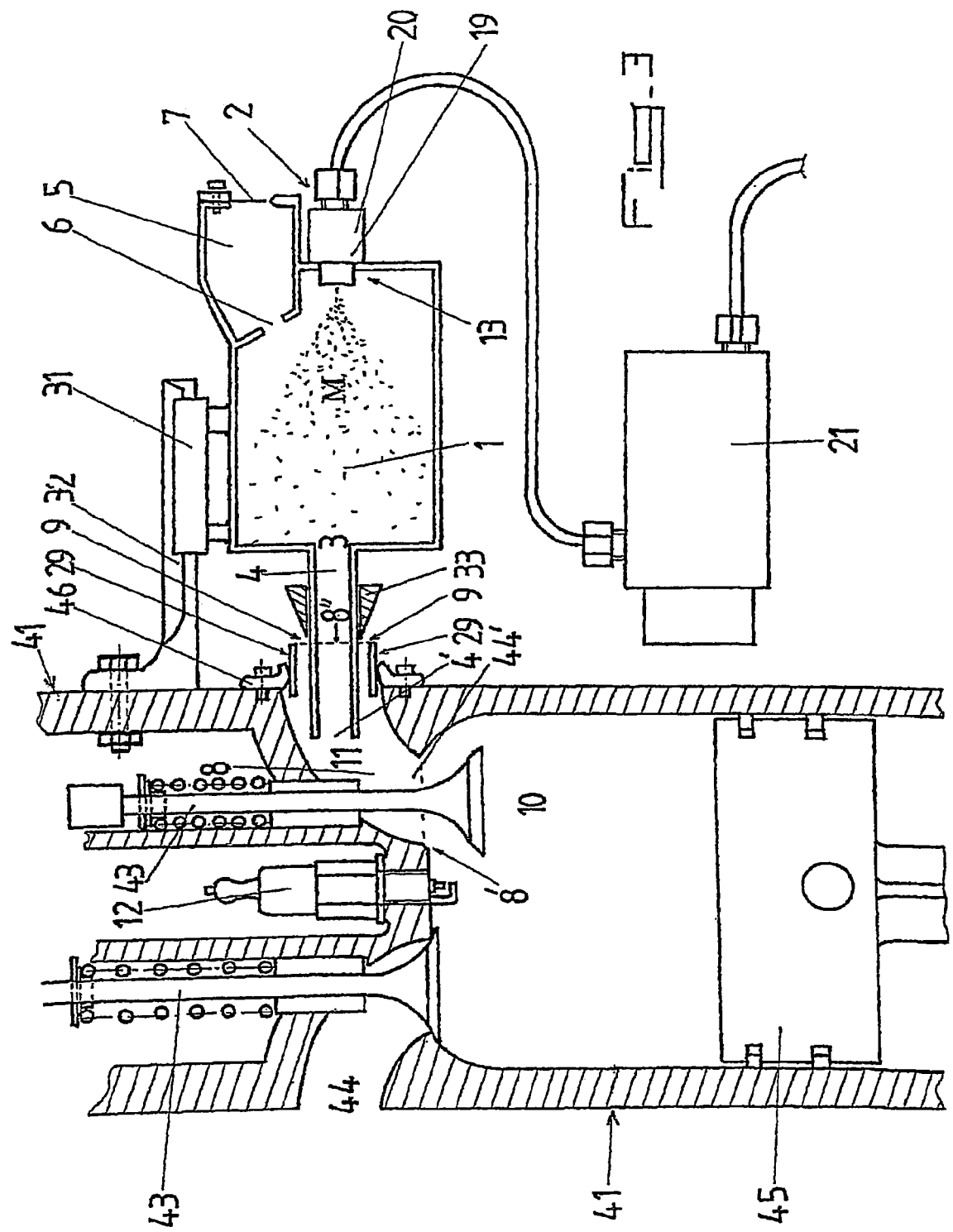

FIG. 3 of the accompanying drawings illustrates a second embodiment of the device according to the invention.

The device is actuated by a four-stroke internal-combustion engine 41 supplied by valves, the reaction produced in return by the device according to the invention maintaining the forced movement of the single cylinder or multi-cylinder internal-combustion engine 41. The soliton chamber 8 of the device according to the invention consists of the combustion chamber of the engine in the intake phase.

The pulsating or cyclical suction member 10 therefore consists of an internal-combustion engine 41 conventionally comprising one or more intake valves 43 and exhaust valves either with controlled ignition or without ignition but with a greater volumetric ratio.

The injection pump 21 for the injectors and/or nebulisers 19, 20 of the supply means 2 for the device according to the invention may advantageously be the multipoint injection pump of the multi-cylinder internal-combustion engine 41.

The intake tube or tubes 44, 44' (optionally each of them) are equipped externally to the inlet portion (designed as air inlet(s) 9) with a soliton (half) chamber 8 in which there is accommodated the sleeve 29 of the elongate pipe 4 of a resonant chamber 1 held in position by a positioning device consisting of a moving carriage 31 travelling on one or more rails 32 connected to the internal-combustion engine 41. A flange 46 is placed in the region of the (external) inlet of the intake tube 44' for receiving the sleeve 29 and facilitating adjustment thereof.

The air intake or intakes 9 of the soliton chamber 8 are located in the region of the nodal plane of the elongate pipe 4 of which the total length corresponds, in an non-limiting example, to the length of travel of the piston 45 for +/−110° of rotation of the top dead centre toward the bottom dead centre.

The air inlet or inlets 9 of the soliton chamber 8 may also be located in line with one of the other possible nodal planes of the device.

The resonant chamber 1 is also provided with an acoustic chamber 5 equipped with an orifice 6 and an acoustic device 7 produced, for example, in the form of an acoustic muff or an acoustic reed.

According to an advantageous characteristic of the invention, the supply means 2 of the resonant chamber 1 are disposed opposite an outlet 3 of said resonant chamber 1 and on the longitudinal axis of an elongate pipe 4.

In this preferred embodiment, the supply means 2 of the resonant chamber 1 are always placed on the side remote from that receiving the elongate pipe 4 but in such a way that the injectors and/or nebulisers 19, 20, in an ideal but not limiting manner, are located in the longitudinal axis of the resonant chamber 1 owing to its small volume. As can be seen in FIG. 3, the acoustic chamber 5, its acoustic device 7 and its orifice 6 are therefore located in a position which is laterally offset from the resonant chamber 1, contrary to the arrangement shown, for example, in FIG. 2 where all the aforementioned elements are centred on the horizontal axis L.

The internal-combustion engine 41 is turned on by a conventional launcher or starter. The injection of the substances M is stalled so that it introduces the selected fuel into the resonant chamber 1 exactly at the moment when the intake valve 43 opens. The intake valve 43 must not be closed before 290° of the rotation of the crankshaft from the top dead centre at the beginning of intake.

In the embodiment described hereinbefore, the volume of the combustion chamber of the internal-combustion engine 41 forms a soliton chamber 8 of which the intake tube 44' corresponds to the narrow ovoidal side (first opening 8') of the more general soliton chamber 8 described in the previous embodiments. The piston 45 against which a movement "belly" is formed generates at least one nodal plane during each vertical movement. The instant wave of depression produced by the movement of the piston 45 on intake passes through the soliton chamber 8 which cooperates with the intake tube 44' before continuing its route to the bottom of the resonant chamber 1 where it is reflected in the direction of the soliton chamber 8 after undergoing a series of reflections in the resonant chamber 1.

When it first passes the soliton chamber 8, the depression gives rise to a first compensation by the passage of external air through the inlets for air 9 constituting solitons but with a delay due to the advanced position of the end 4' of the elongate pipe 4 relative to that of the air inlets 9. The travel of the piston 45 thus generates a plurality of depression pulses which are reflected on the bottom of the resonant chamber 1, activate the acoustic device 7 and, each time, involve a wave of external air which is a component of soliton propagation, of which the amplitude increases at each pulse received from the piston 45. As the resonant chamber 1 and the variable-volume combustion chamber of the internal-combustion engine 41 are in a depressed state, the amplitudes of contractions are increased.

When the piston 45 is at the bottom dead centre, the movement "belly" continues its evolution in expansion and passes to contraction before 290°. This contraction of the soliton at its extreme amplitude tends to condense the substance field. The contraction of the more labile dihydrogen molecules leads to ruptures of bonds which increase the amplitude of this contraction. To avoid possible crystallisation of carbon and to check the amplitude of contraction during the rise of the piston 45 toward the top dead centre, the intake valve 43, which keeps contact through the air inlets 9 with the external air has to remain open at least to an angular value of 290°. The position of the carriage 31 is adjusted so that the compensation by the wave of external air in the soliton chamber 8 takes place.

The top dead centre after closure of the intake valve 43 constitutes the virtual nodal plane equivalent to that of the first opening 8' of the soliton chamber 8 in the preceding embodiments. The "complement" of vacuum by ignition by means of the ignition aid 12, or a spark plug in this case, has to intervene at this moment. This operation is faster than in conventional systems and requires less advance and must be programmed with about +/−10° of advance over the top dead centre. For an engine without ignition, the position of the end 4' of the elongate pipe 4 in combination with the adjustment of the air inlets 9 and of the position of the carriage 31, factors of the macroscopic wavelength of the soliton field, allow the nodal plane preceding acceleration to be positioned just at the level of the top dead centre. The contraction of the field after passage to the bottom dead centre consumes the heat of the combustion chamber and this causes the engine to heat less than its conventional homologue. As the steady movement continues after ionisation, the emptying of the soliton chamber 8 is facilitated by the contraction of the field at the exhaust.

As ionisation does not lead to oxidation reactions, the engine operating with the device according to the invention is "clean" and is of particular value for the environment.

FIG. 4 of the accompanying drawings illustrates a third embodiment of the device according to the invention. The device is activated by a two-stroke internal-combustion engine 42 (suggested in broken lines), in which the soliton chamber 8 is distributed between the two pulsating volumes:

the intake connected to the outlet 3 of the resonant chamber 1 and the combustion chamber, as described hereinafter.

As will be seen very clearly in the aforementioned FIG. 4, this embodiment of the device according to the invention comprises a certain number of means which are common to those described in the preceding embodiments and will not all be recited or described again here.

In the embodiment illustrated, the device is introduced into the intake opening, either from the bottom of the engine or through the intake tube 44 in the case of an attached chamber.

A flange 46 is also placed on the inlet of the intake orifice to receive the sleeve 29 and facilitate its adjustment. The fuel is introduced through one or more injectors and/or nebulisers 19, 20 and, depending on its nature in the resonant chamber 1, at the precise moment of commencement of the intake. The fuel is conditioned then introduced into the space formed by the association of the conditioning space with the combustion chamber.

To facilitate the transfer and for a better check of conditioning, the outlet port in the combustion chamber remains open for longer. In this case, a valve located on the transfer duct closes after 290° or due to pressure so as to oppose the return into the part of the resonant chamber 1 (conditioning chamber). The device according to the invention may be fitted on a conventional engine and does not require further modification.

Various means may be used to supply two-stroke engines, either via the engine bottom or via an independent attached chamber. In the latter case, all compression devices should be eliminated and only those which aspirate in a phase opposed to that of the engine piston may be used as pulsating suction members 10. If the engine bottom forms part of the soliton chamber 8, the condition is achieved immediately, the piston reducing the volume of the combustion chamber and increasing that of the soliton chamber 8 which automatically beats in the reverse phase of the combustion chamber constituting the complement of the soliton chamber 8.

If conditioning is carried out in an attached part of soliton chamber 8, its volume must beat exactly in the opposite direction to that of its complement, the combustion chamber. In fact, the contribution of the two volumes varying in opposite directions ideally reproduces the steady conditions of the soliton chamber 8 of the device in FIG. 1 or 2, in which there is a velocity "belly" at the end 4' of the elongate pipe 4 and a contraction at the nodal plane of the first opening 8'.

The moment of injection is dictated by the bottom position of the piston at the beginning of intake by its rise toward the top dead centre. The fuel introduced through a plurality of injectors and/or nebulisers 19, 20 is conditioned in the resonant chamber 1 and then aspirated through the elongate pipe 4 by the rise of the piston toward the top dead centre. During the suction which results from the movement of the piston, the field reaches the velocity "belly" state through the end of the elongate pipe 4 in the part of the soliton chamber 8.

Corresponding to the same phenomenon as the beating of the piston of the four-stroke cycle, there is a nodal plane before +/−110° of the descent of the piston and before +/−290° of the rise. There must be a "belly" against the piston which acts without these bottom dead centre and top dead centre positions being its axis. As the piston rises from the bottom dead centre to the top dead centre, there is a nodal plane before +/−290°, and the direction of expansion of the entering field becomes direction of contraction. The contraction movement would tend to pull back the piston if the open passage of the air inlets 9 did not carry out compensation during the end of the rise to the top dead centre. When the piston re-descends from the top dead centre to the bottom dead centre, the field is contracting, thus facilitating this movement. In the descent of the piston before +/−110°, the movement of the field is reversed and returns to expansion. Whereas the course of the piston clears the transfer port, the expansion pushes the field through this available route toward the combustion chamber to such an extent that the combustion chamber, in the exhaust phase, is depressed due to the contraction of the exhaust. The substance field is thus transferred above the piston. The piston rises toward the top dead centre before +/−290°, and the movement of the field returns to contraction, the transfer port being closed by the rise of the piston so the contraction is no longer compensated by the air inlets 9. On the contrary, the amplitude is increased by the ruptures of the hydrogen, the contribution of the vacuum of the spark plugs of the ignition aid 12 increasing the velocity pulse and causing the disruptive effects of the polarised charges.

This contraction depends on the adjustments, by the position of the carriage 31, of the end 4' of the elongate pipe 4 and on the adjustment of the air inlets 9. The wavelength must also be adjusted relative to the top dead centre so that the ionisation is not premature, as this would cause the engine to knock, or delayed, as this would cause a loss of power. The velocity or internal frequency of the field may be checked by the acoustic muff of the acoustic chamber 5 without varying the flow rate of fuel or by increasing the quantity of particles by increasing the flow rate of the injectors and/or nebulisers 19, 20.

The expansion following acceleration to the top dead centre pushes the piston back toward the bottom dead centre and, in accordance with the steady process, toward the bottom dead centre where the expansion passes to contraction while creating a vacuum at the moment of exhaust at the same time as the following substance field, which was conditioned in the first part, is expanding with all inlet and exhaust transfer ports open. The contraction of the exhaust assists the introduction of the prepared field through its intake transfer port, without the need for a non-return valve in the air inlet 9 part of the fraction of soliton chamber 8 at the inlet of the elongate pipe 4.

In a further variation, the top port of the supply transfer is open at the top so its closure by the piston is delayed in order to increase the transfer term. A controlled non-return valve are thus interposed in the transfer duct so that the substance field is not disturbed in the preparation zone by a return of pressure from the driving phase (after ionisation), which would also lead to a loss of power.

FIG. 5 of the accompanying drawings illustrates a fourth embodiment of the device according to the invention. The device is actuated by a gas turbine 38 attached to the first opening 8' of the soliton chamber 8, or else to the flow rate accelerator 30 or venturi, the first blade 39 producing pulsating suction. The device in this variation is capable of using at least two expansion phases whereas the previously described piston systems use only one expansion phase.

As shown in said FIG. 5, a gas turbine 38 has, at the inlet, before a first combustion chamber 48, a first blade 39 of a suction turbine 47 which is connected directly to the flow rate accelerator 30 or adjustable venturi open to the exterior which follows the first opening 8' of the soliton chamber 8 of a device as described in particular in the embodiments illustrated in FIG. 1 or 2.

The gas turbine 38 is equipped with a launcher or starter for creating the initial suction. After the suction turbine 47 there is a combustion chamber 48 consisting of a divergent portion followed by a portion having a cross-section ending with a receiving turbine 49. The combustion chamber 48 is equipped with an ignition aid 12. The outlet of the receiving turbine 49 opens at a divergent portion of chamber 40 connected to a longer convergent portion terminated by another turbine 50, the two associated portions constituting the chamber 51 equipped with air inlets 9 of adjustable cross-section communicating with the exterior and located in the divergent portion 40. The outlet of the turbine 50 opens at a divergent portion open to the exterior. All the turbines are connected to a shaft 52 for connection to a conventional energy producer 53.

The suction turbine 47 is activated by the starter. At the same time, fuel is injected continuously into the resonant chamber 1 by suitable devices (not shown). The suction caused by the suction turbine 47 conditions the fuel field in the resonant chamber 1 reverberating under the influence of the acoustic device 7 of the acoustic chamber 5 (not shown). The conditioned field is aspirated by the elongate pipe 4 and is presented to the nodal passage of the first opening 8' where it is accelerated. Absorbed by the suction turbine 47, it opens into the combustion chamber 48 where the electronic ignition aid 12 completes the acceleration and initiates the flame.

The expansion of the following ionisation creates, in the straight portion of the combustion chamber 48, a pressure equivalent to a force applied to the outlet oriented through the blades of the receiving turbine 49 connected to the shaft 52 which receives this rotational force. At the outlet of said receiving turbine 49, a divergent portion of chamber facilitates the exhausting of the passages through this turbine while creating a contraction zone controlled by the air inlets 9 of adjustable cross-section in contact with the exterior so as to prevent the condensation and aborting of the steady system constituting a new expansion which follows contraction.

The expansion which generates a new pressure is contained by a converging portion which guides the field to a new turbine 50. The passages of this turbine, which are oriented in the same direction as those of the receiving turbine 49 also receive a pressure in a direction of rotation transmitted to the shaft 52 to which this turbine 50 is connected. The outlet of the turbine 50 opens at a divergent portion of conduit which is open to the exterior and assists the passage through the blades.

Figure 7:
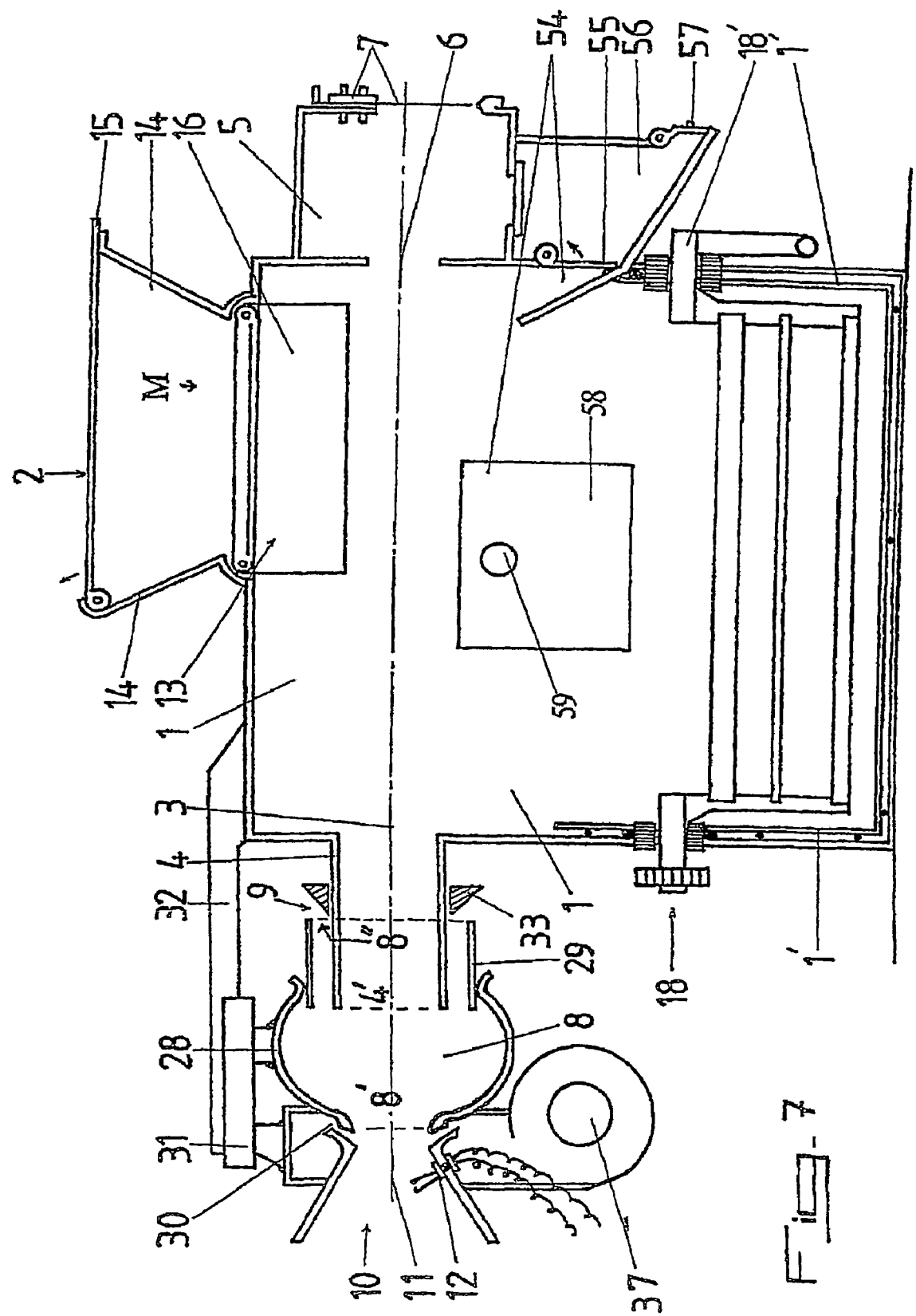
Figure 9:
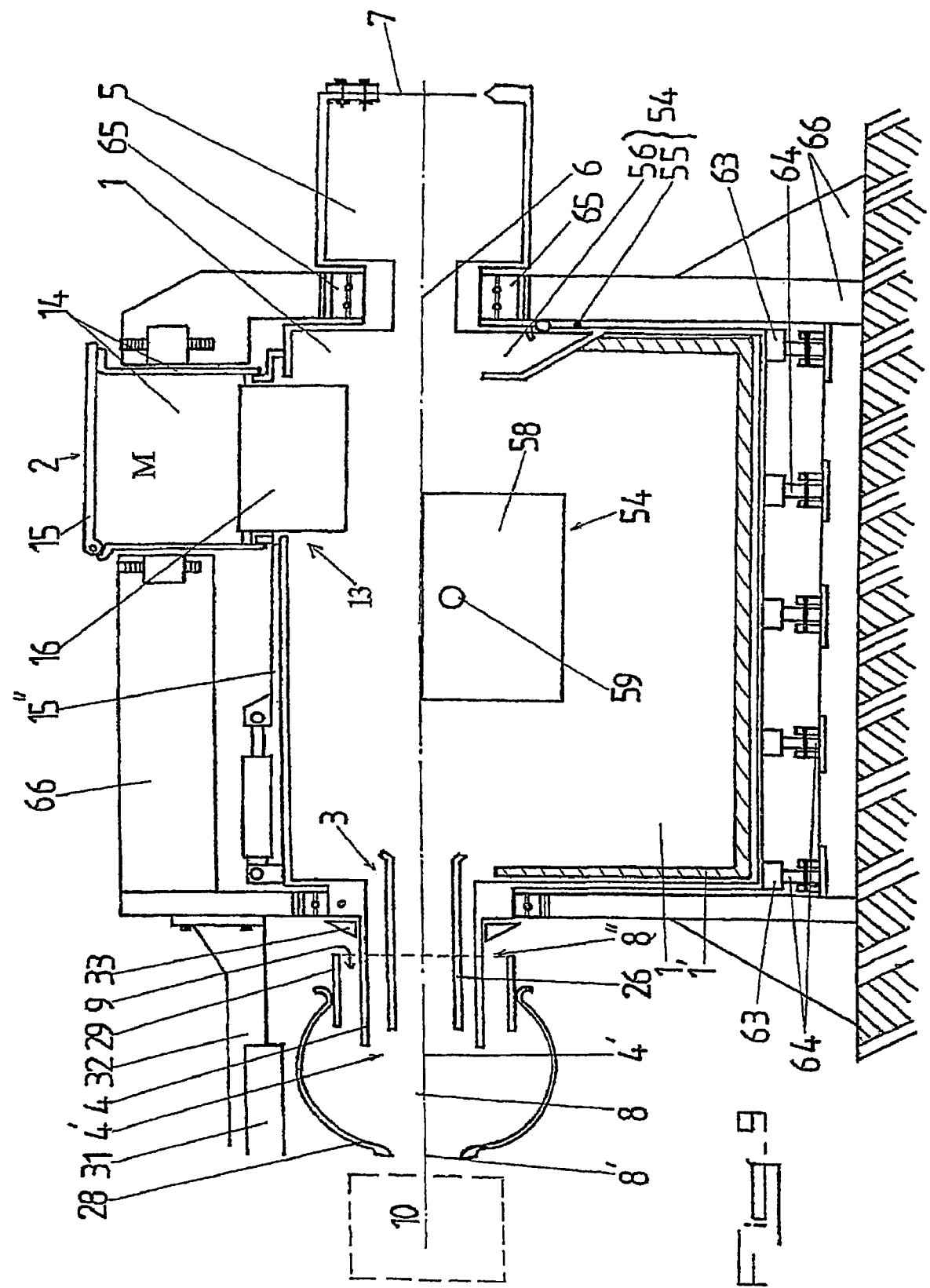

Owing to the coherence of the flames of the laser type, industrial devices such as those shown in FIGS. 7 and 9 are capable of supplying large multi-storey turbines.

FIG. 6 of the accompanying drawings shows a fifth embodiment of the device according to the invention. The present device employs the devices of FIG. 1 or 2 to expand the air admitted under positive pressure in a combustion chamber and to multiply this pressure by the heat and quantity of movement transmitted to this air by the ionised field from a divergent exhaust means which turns it into a jet propulsion device in the ambient air.

As shown in said FIG. 6, the present propulsion device consists of one of the devices of FIG. 1 or 2, of which the soliton chamber 8 is associated with one or more adjustable convergent deflectors 35. This deflector or these deflectors 35 are connected to a spherical or else cylindrical expansion chamber 36' of which the coupling to the soliton chamber 8 forms a flow rate accelerator 30 or venturi supplied by the deflector or deflectors 35 followed by a portion of divergent cross-section, the remainder of the expansion chamber 36' ending with a convergent portion connected to an outlet in the form of a divergent member 36". The expansion chamber 36' and the associated deflector or deflectors 35 are connected to a carriage 31 of which the position may be adjusted relative to the general support produced in the form of one or more rails 32. As the divergent member 36" for the discharge of air under pressure is a means of propulsion, the direction of operation is determined by a direction of movement which is characterised in that the acoustic chamber 5 is located at the front of the device and in which the divergent member 36" constitutes the rear part. In a further variation, not shown, a blowing turbine 37 supplies the convergent deflector 35 during the activation phase.

The device described above is started in accordance with the direction of operation of the acoustic chamber 5 and of its acoustic device 7 located at the front. The deflector or deflectors 35 pick up a quantity of air which is pressurised by reducing the convergent direction of these deflectors 35. The air pressure at the bottom of the convergent member or members is applied and activates the venturi. The resultant pulsating suction acts on the soliton chamber 8, is transmitted to the resonant chamber 1 via the elongate pipe 4 and then via the acoustic chamber 5 up to the acoustic device 7 which reacts by imprinting a vibration of the pulsating system. The injection of fuel is activated in the resonant chamber 1 of which the macroscopic pulsating regime lined by the vibratory effect transmitted by the acoustic chamber 5 conditions the fuel injected in the form of a field or mist.

The field of particles or mist is aspirated through the elongate pipe 4 and reaches the nodal plane of the first opening 8' where it undergoes acceleration completed by ignition of the ignition means 12 which ionises the field. The parameters of distance between end 4'/first opening 8' and first opening 8'/expansion chamber 36' and the air inlets 9 are adjusted according to the aim. The opening of the venturi is increased owing to the adjustment of the position of the carriage 31' connected to the expansion chamber 36'.

A larger quantity of external air under pressure enters said chamber and is intimately mixed with the field to whose ionisation it contributes. The intense release of heat and the expansion phase multiplied by the polarised ionic effects added to the quantity of air thus incorporated form a pressure which contributes to the increase in the kinetic velocities of the convergent form of the rear part of the expansion chamber 36'. The divergent member 36" thus contributes to the supersonic ejection of the mass of the moving field which abuts against the external atmosphere.

To avoid shock waves in the region of the connection between the outlet of the expansion chamber 36' and the divergent member 36" constituting a nodal plane, said divergent member 36" advantageously has a progressive elongate shape which tends to move to the back the vacuum space of the nodal plane and distributing the resultant thrust over a portion and not at a point, which would be destructive.

Further advantageous variations of the device according to the invention will now be described by way of non-limiting examples. FIGS. 7 to 11 show devices according to the invention in which the resonant chamber 1 has been adapted to the type of substances M used. Thus, variations which are particularly suitable for the treatment of types and waste propose the use of a fixed tank (FIGS. 7 and 8) or moving tank (FIGS. 9 and 10), residue extractors, precipitate tanks, etc.

Figure 8:
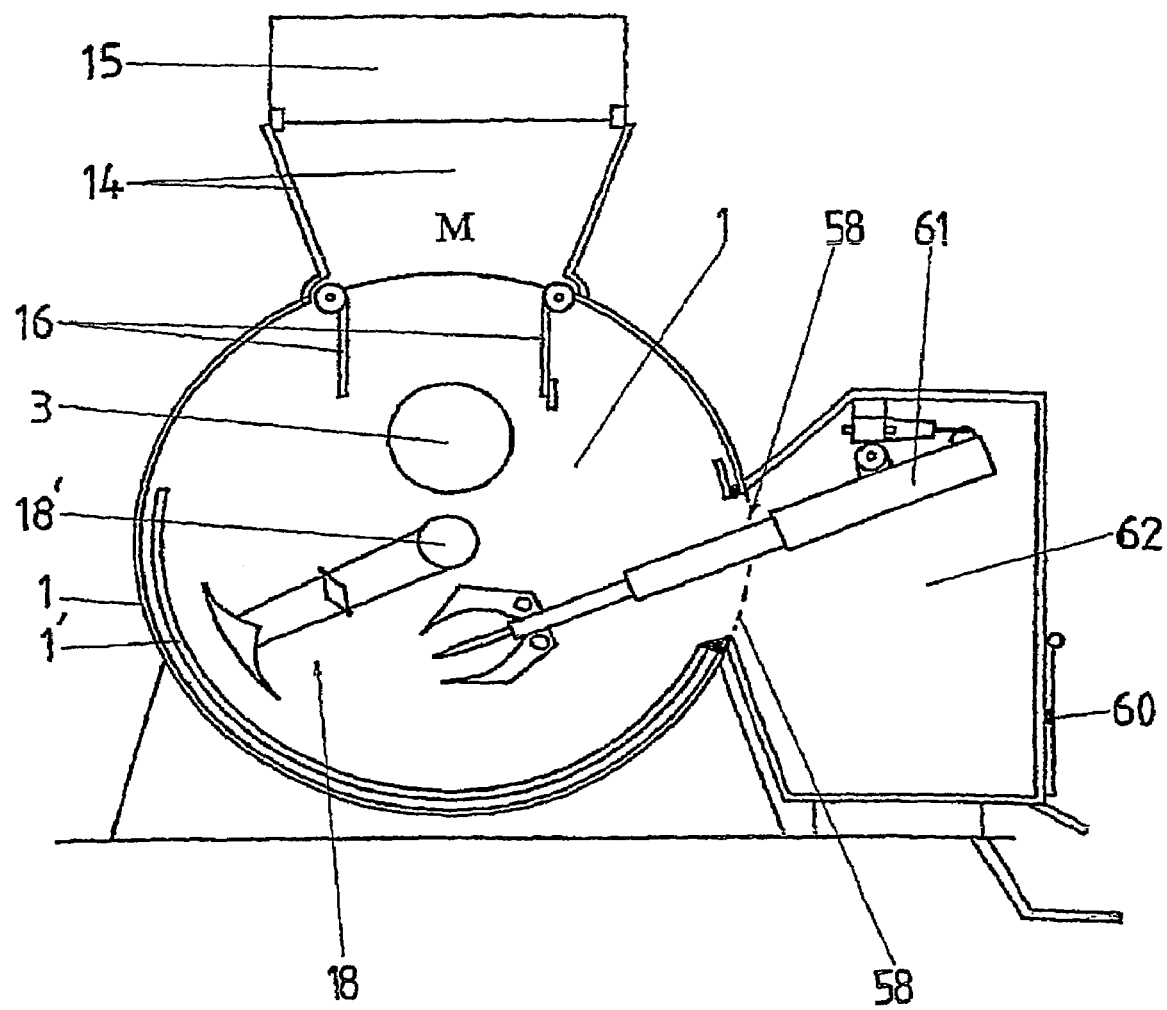
FIGS. 8 and 10 are simplified front sections of the devices according to FIGS. 7 and 9.

The variation shown in FIGS. 7 and 8 provides a resonant chamber 1 equipped with a hopper 14 intended in particular for solid or fusible substances M (wood, plastics materials, etc.).

As shown in FIGS. 7 and 8, the device intended for the treatment of heteroclitic solid waste consists of a fixed resonant chamber 1 having a volume adapted to the nature of this waste. This resonant chamber 1 is characterised by an eccentric alignment of the axis connecting the soliton chamber 8 to the acoustic device 7, an enlargement at the bottom of the resonant chamber 1 which is equipped with a protective partial double enclosure or with a heat exchange device in the area of deposition of the solid substances and by at least one stirrer 18.

The device according to the invention, of which the size is limited by the conditions for stirring the substance is characterized by its ease of use. According to FIG. 7, it comprises a resonant chamber 1 equipped, on one side, with an elongate pipe 4 and, on the other side, with an orifice 6 opening into an acoustic chamber 5 equipped with an acoustic device 7.

The resonant chamber 1 is set up to receive the substance in its bottom part on a refractory insulating covering 1' or merely a double wall of the external casing. A sleeve 29 for facilitating adjustment of the soliton chamber 8 is fixed to the elongate pipe 4 of the resonant chamber 1 so as to form one or more air inlets between said sleeve 29 and the external face of said elongate pipe 4.

As described in detail hereinafter, an additional sleeve (not shown) may be placed inside the elongate pipe 4 if the elongate pipe 4 is large.

According to a characteristic of the invention, the supply opening or openings 13 are topped by at least one hopper 14 which may be equipped with an upper closure door 15 and a lower closure door 16 and/or a lower grid 17.

Advantageously, the hopper or hoppers 14 may comprise heaters 22 (not shown) for the substance or substances M intended to supply the resonant chamber 1.

The device may also comprise one or more outlets 54 produced, for example, in the form of a trap 55 and a sealed ash pan 56 closed by a discharge 57 and/or in the form of a sliding door 58 which opens into a connected cooling container 62 communicating with the resonant chamber 1 via a vent 59 in said sliding door 58, wherein said cooling container 62 may be equipped with a discharge door 60 which is sealed from the exterior and provided with a telescopic gripper 61 for removal of said waste.

As explained in the preceding embodiments, the device comprises a soliton chamber 8 located in the axis and in front of the elongate pipe 4 fixed to a moving carriage 31 on one or more rails 32 connected to the resonant chamber 1. The size of the intakes of the air inlets 9 varies with the frictional sliding of the carriage 31 on the rail or rails 32, the sleeve 29 fixed to the elongate pipe 4 sinking more or less deeply on said elongate pipe 4 while adjusting the distance between the first opening 8' of the soliton chamber 8 and the end 4' of the elongate pipe 4, the space between the sleeve 29 and the elongate pipe 4 thus acting as a passage communicating with the exterior, of which the opening may also be controlled by the elements 33 produced, for example, in the form of a further conical sleeve which may be displaced by sliding or by helical rotation on the elongate pipe 4.

The pulsating suction member 10 and the flow rate accelerator 30 (venturi or the like with variable flow rate) attached tightly to the first opening 8' of the soliton chamber 8 are fixed to the common support, namely the carriage 31 travelling on the rails 32. The pulsating suction member 10 is supplied by a fan or a blowing turbine 37 or else its movement is maintained by the reaction, once activated, or by a static draught of the type found in a chimney. The divergent member of the pulsating suction member 10 is equipped with a spark plug or electrode type ignition aid 12.

The device according to the present invention is also characterised in that at least one device 18 is provided for stirring the solid substance or substances M introduced into said resonant chamber 1.

A stirrer 18 of this type for the substance may be, for example, an oscillating stirrer comprising arms, longitudinal blades, etc. of which the partial axes 18' may be located at the centre in the axis of the resonant chamber 1 (cf. FIG. 8) and which communicate with the exterior and are driven there by a motorised device (not shown) which generates the oscillating movement of the stirrer 18 via pinions, connecting rods, hydraulic means or any other suitable means. Manual or automatic control means may also be provided on all the aforementioned moving parts, and a computerised monitoring and management centre connected to sensors located at strategic points may also be provided for controlling the movements of the aforementioned adjustment members.

The substance or substances M supplied in successive charges are placed in the fixed hopper 14. The upper door 15 is then closed, the opening of the lower double door 16 allowing the substances M to pass in the resonant chamber 1. When the lower door 16 is closed, the hopper 14 may be reloaded for a new cycle of supplying the resonant chamber 1.

When the resonant chamber 1 is loaded with an adequate quantity of substances M, ignition is carried out in the conventional manner. In particular, it is possible to add highly inflammable substances to the first load (paper, cardboard, etc.) to facilitate this ignition. Once ignition has occurred, the blowing turbine 37 and, consequently, the flow rate accelerator 30 are started up as well as the ignition aid 12. In order to activate ignition rapidly, the adjustment of the acoustic device 7 is completely opened. The flow rate accelerator 30 is adjusted to the lowest in correlation with the widely open air inlets 9 of the soliton chamber 8 and with the first opening 8' brought toward the end 4' of the elongate pipe 4.

When the mass is burning well, the stirrer 18 is activated, either at slow speed and continuously or more quickly but intermittently. Once actual ignition has occurred, the air passage of the acoustic device 7 is closed progressively, causing the depression to rise progressively at the same time as the pulsating regime is established. Soon after the appearance of the mist in the region of the flow rate accelerator 30, the flame is established in the divergent member of the venturi. When the flame is stabilised, the ignition aid 12 may be stopped. As the flow rate is increasing due to the general ignition of the resonant chamber 1, the progress of the radiating flame is followed by appropriate operations such as adjustment of the acoustic device 7 toward its point of minimum operation, increase in the distance between first opening 8/and outlet 3 (or of the distance between first opening 8' and end 4'), adjustment of the intake of the air inlets 9 and increase in power of the flow rate accelerator 30 until the flow rate corresponding to the velocity of conditioning in the resonant chamber 1 is established.

In fact, if the flow velocity at the venturi is too slow relative to the conditioning velocity in the resonant chamber 1, the particle field is saturated and heavier, the inadequate velocity pulse at the passage of the first opening 8' revealing unburnt $C_xH_y$. If, on the other hand, the depressive force applied by the flow rate accelerator 30 is too high or the intake of the air inlets 9 is too restricted, the reinforcement of the amplitudes of contraction due to the release of hydrogen is poorly compensated and the piezoelectricity is observed due to the appearance of $SO_2$ and nitrogen oxides $NO_x$. The poor adjustment is also manifested by soiling of the elongate pipe 4 and/or production of tar in the soliton chamber 8. The defect may be due merely to a deficit of oxygen measured in the waste. In this case, it is attributable to the opening of the air inlets 9 and to the force applied by the venturi, which must remain strong enough to promote the reflection of the wave in the form of recirculation.

At the same time, the hopper 14 has been reloaded and, as the charge of the resonant chamber 1 diminishes, the lower doors 16 are opened to introduce a new charge into the resonant chamber 1. The lower doors 16 close and a new cycle may begin, depending on the rate of transformation prevailing in said resonant chamber 1.

Heteroclitic waste such as domestic waste as well as tyres may contain metal parts such as reinforcements and the like which emerge from the more coherent mass of substance in the manner of large pieces of grit emerging from a heap of sand and falling at the edges of said heap which, in this instance, corresponds to the centre of the amplitudes of stirring of the mass in depth by the blades. The same applies to ash. If the quantity of accumulated unburnt substances exceeds a certain limit, they must be removed. This operation may be programmed or take place at any moment, the discharge container being connected to the resonant chamber 1. For this purpose, the sliding door 58 is opened, the gripper 61 (grab, claw or articulated telescopic clamp) scrapes off the deposited substances and brings the ash back to the ash pan 56 provided for this purpose. It then grasps, shakes or vibrates the recovered substances in order to eliminate adhesions and deposits them in a cooling container 62 while awaiting their final removal. The opening or the trap 55 of the ash pan 56 may preferably be located below the orifice 6 owing to the effect of precipitation induced at this level by the stream of fresh air coming from the acoustic device 7.

Depending on the nature of the waste, some of which evolve more quickly into the phase of dissociation or produce more heat, it may be necessary to cool the reaction. For this purpose, the wall of the resonant chamber 1 may be backed by an insulating covering 1', for example a sheet of water connected to any cool source.

Figure 10:
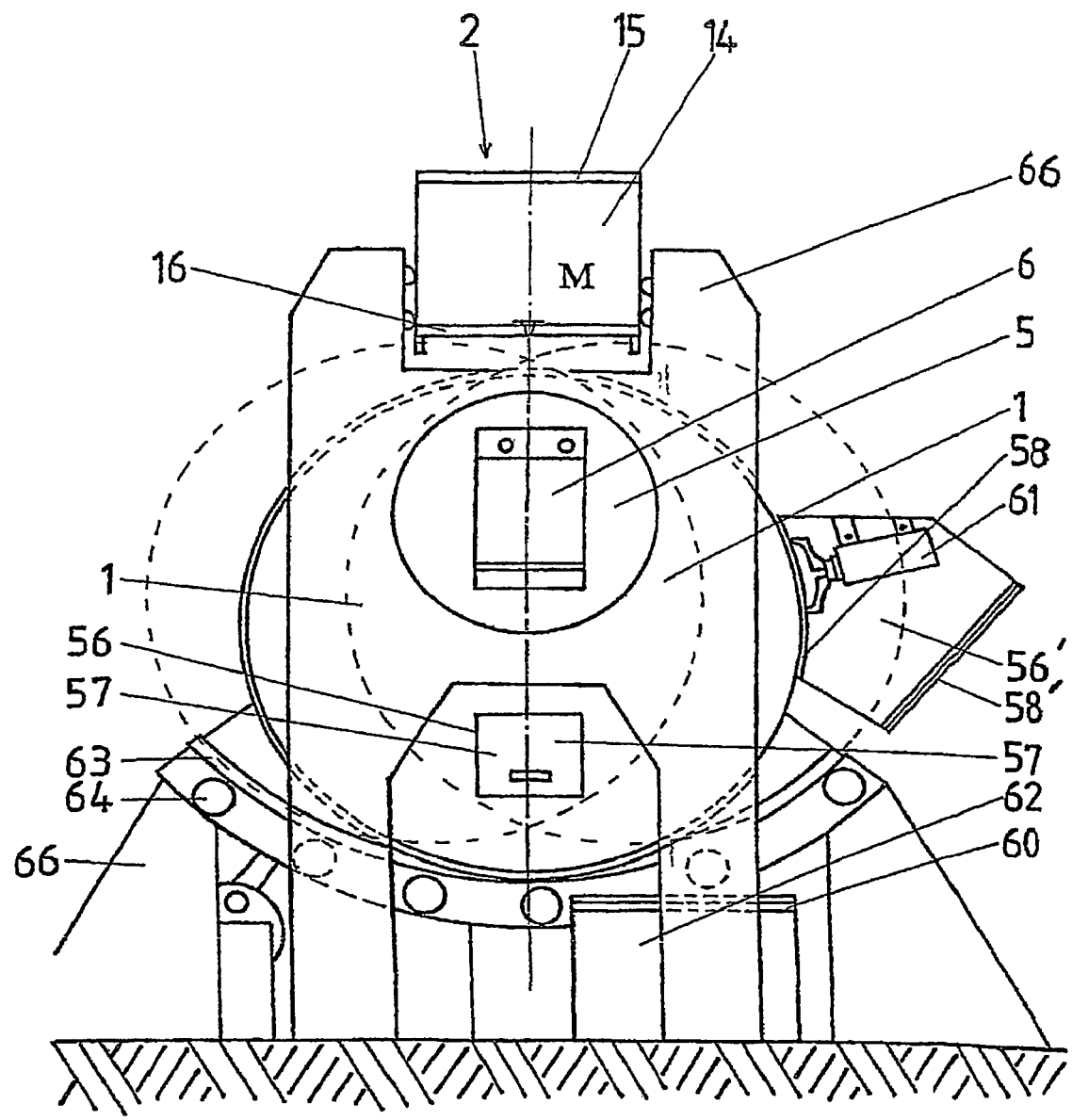

FIGS. 9 and 10 show a further embodiment of the device according to the invention which is characterised by the setting into motion of the resonant chamber 1 in order to stir the substances in large chambers suitable for the treatment and handling conditions of heteroclitic solid waste containing, for example, hydrocarbons.

The device shown in said figures is characterised in that the resonant chamber 1 contains gravimetric solid substances deposited at its bottom. As these substances are static, they are then stirred or moved to ensure the maintenance and uniformity of the transformation reaction.

The illustrated device comprises a resonant chamber 1 equipped with an elongate pipe 4 and with an acoustic chamber 5 provided with an orifice 6 and is arranged so as to receive the substance in its lower part on a refractory insulating covering 1' or merely a double wall of the external casing, the axis of alignment of the elongate pipe 4 and of the orifice 6 being eccentric toward the top of the resonant chamber 1 which comprises, on its lower external face, one or more running treads 63 and track rollers 64 positioned as a function of the axis of rotation defined by the elongate pipe 4/orifice 6 axis relative to the axis of the resonant chamber 1.

The elongate pipe 4 consists of a tube which is open at both ends, one connected tightly to one side of the resonant chamber 1 and the other constituting the end 4' entering in the soliton chamber 8 (the pulsating suction member 10 and its accessories is only suggested in this view) opposite its first opening 8'.

In the case of devices according to the invention designed for the treatment of substances which may be moist such as domestic refuse or sludge and which may be subject to premature condensation, in the case of very large devices, in other words for a ratio:

length of resonant chamber 1
→1
length of elongate pipe or pipes 4 or in the case of an elongate pipe 4 having a cross-section greater than 0.20 m² for a ratio:

length of resonant chamber 1
→0.25,
length of elongate pipe or pipes 4 and with the streams of substance M which are sensitive to the effects of walls which would be amplified by contact with the cooler air circulating in the opposite direction, when using light or gaseous fluids with one or more special elongate pipes 4 in which the reflux of substance M driven by the recirculation of the air from the soliton chamber 8 to the resonant chamber 1 is limited, at least one recirculation guide 26 having a cross-section smaller than that of the pipe or pipes 4 is provided at least in part inside said elongate pipe or pipes 4, for example in the form of an elongate sleeve opening in the resonant chamber 1.

As illustrated in FIG. 9, this recirculation guide 26 delimits the space for recirculation of the air for compensating the depression in the resonant chamber 1. A sleeve 29 intended to facilitate adjustment of the operation of the soliton chamber 8 is fixed to the elongate pipe 4 of the resonant chamber 1 in order to form a passage for the air inlets 9 between itself and the external face of said elongate pipe 4.

A reinforcement outside the elongate pipe 4 at the level of the resonant chamber 1 constitutes a movement axis inside a bearing 65.

Furthermore, the opening 13 for the supply of substances M to the resonant chamber 1 is closed by a sliding panel 15" with controlled or automatic opening. The supply means 2 advantageously consists of a hopper 14 closed by an upper loading door 15 and a lower discharge door 16 with two leaves and is connected to a positioning device which is itself connected to the frame 66, wherein all movements may be controlled manually or automatically.

The device illustrated in FIGS. 9 and 10 may also comprise one or more outlets 54 produced, for example, in the form of an ash pan 56 closed by a trap 55 opening at the exterior for possible emptying. A second outlet 54 through a sliding door 58 opens into a lock chamber 56 which is sealed from the exterior and equipped with a second sliding door 58' facing the sliding door 58 so as to be located horizontally in the lower discharge position (cf. FIG. 10).

A telescopic gripper 61 is provided on the sealed lock chamber 56'. A sealed cooling container 62 is connected by a flexible hose to the sealed lock chamber 56', of which the sliding door 58 comprises a special vent 59 which is permanently open into the resonant chamber 1.

The acoustic chamber 5 is equipped with its acoustic device 7 of which the orifice 6 is configured, in a non-limiting embodiment, so as to constitute an axis for movement inside a bearing 65. The soliton chamber 8 located at the front of the elongate pipe 4 and in its axis, is fixed to a carriage 31 which is carried by one or more rails 32 connected to the frame 66 in such a way that said soliton chamber 8 is able to slide on the sleeve 29 connected to the elongate pipe 4 of the resonant chamber 1 for adjusting the distance between the first opening 8' of this soliton chamber 8 and the end 4' of the elongate pipe 4, the space between the sleeve 29 and the elongate pipe 4 acting as air passage for the air inlets 9 of which the cross-section may be monitored by elements 33, for example a further conical sleeve which may be adjusted by sliding or else by helical rotation on the elongate pipe 4.

The pulsating suction member 10, the variable flow-rate accelerator 30 (venturi, adapted turbine, motor, etc.) is attached tightly to the first opening 8' of the soliton chamber 8, the pulsating suction member 10 being fixed with said soliton chamber 8 to the common support (carriage 31). It is supplied by a blowing turbine 37 and optionally equipped with a spark plug or electrode type ignition aid 12, as necessary.

The rail or rails 32 connected to the frame 66 comprise a device for adjusting the course between the first opening 8' and the outlet 3 (or the end 4' of the elongate pipe 4 defining the point of reference of the half wave of the stream guiding the position of the first opening 8' of the soliton chamber 8).

The device also comprises running treads 63 and track rollers 64 for the cradle-type support of the resonant chamber 1 connected to a fixed frame 66 comprising the bearings 65 and the supporting base of the moving soliton chamber 8. A device which generates the oscillating movement of the resonant chamber 1 is also provided as well as means for controlling the moving members, a computerised monitoring and management centre connected to sensors located at strategic points and to the adjustment members.

The substances which are supplied in successive loads are placed in the fixed hopper 14, the upper door 15 then being closed. Owing to its rocking movement around the axis of the elongate pipe 4 and of the orifice 6 in the bearings 65, the resonant chamber 1 places its sliding panel 15" opposite the lower door 16 of the hopper 14 and releases a securing bolt which immobilises the resonant chamber 1. The sliding panel 15" opens to allow opening of the lower double door 16 of the hopper 14. The substance or substances M fall in the resonant chamber 1. The doors close in the opposite sequence. Once the discharge of the waste is complete, general unbolting releases the resonant chamber 1.

When the resonant chamber 1 is loaded with an adequate amount of substances M, ignition and start-up are carried out as explained hereinbefore.

If a release of the immobilisation is adjusted to, for example, six oscillations (time estimated for the disappearance of a quantity of substance treated in the resonant chamber 1), the sliding panel 15" appears opposite the hopper 14, the bolt secures the resonant chamber 1 and stops the driving force of the oscillating movement. The hopper 14 descends into position, the sliding panel 15" and the lower door 16 open in succession, the load slides in the resonant chamber 1, the doors close in the opposite direction, unbolting frees the moving assembly, the source driving the oscillation is reactivated and so on as a function of the programming depending on the consumption of substances M in said resonant chamber 1.

Heteroclitic waste such as domestic waste as well as tyres may contain metal parts such as reinforcements and the like which emerge from the more coherent mass of substance in the manner of large pieces of grit emerging from a heap of sand and falling at the edges of said heap which, in this instance, corresponds to the centre of the amplitudes of stirring of the mass in depth by the blades. The same applies to ash. If the quantity of accumulated unburnt substances exceeds a certain limit, they must be removed. This operation may be programmed or take place at any moment, the sealed discharge lock chamber 56' being connected to the resonant chamber 1. For this purpose, the sliding door 58 is opened, the gripper 61 (grab, claw or articulated telescopic clamp) scrapes off the deposited substances and brings the ash back to the ash pan 56 provided for this purpose. It then grasps, shakes or vibrates the recovered substances in order to eliminate adhesions and deposits them in a cooling container 62 while awaiting their final removal.

The opening or the trap 55 of the ash pan 56 may preferably be located below the orifice 6 owing to the effect of precipitation induced at this level by the stream of fresh air coming from the acoustic device 7. When the resonant chamber 1 is in the loading position, the sealed lock chamber 56' is vertically in line with the cooling container 62. Taking advantage of the stoppage for loading, the cooling container 62 is raised, for example by hydraulic means, and sticks against said sealed lock chamber 56'. The second sliding door 58' and the discharge door 60 open opposite one another and the waste from the sealed lock container 56' falls into the cooling container 62. The doors close again and the two combined operations are carried out without interrupting the reaction, the movement of the assembly possibly resuming and therefore continuing repetitively. As the ash pan 56 is independent, it is possible to empty it into an auxiliary container provided for this purpose during a stoppage in loading. The same applies to maintenance of the acoustic chamber 5.

Depending on the nature of the waste, some evolves more quickly into the dissociation phase or produces more heat, so it is necessary to cool the reaction. For this purpose, the wall of the resonant chamber 1 may be lined with an insulating covering 1', for example a sheet of water connected to any cold source.

According to a particularly advantageous embodiment, the hopper or hoppers 14 may be displaced above the supply openings 13 of the resonant chamber 1, from one supply opening 13 to another supply opening 13.

The devices described in FIGS. 1, 2, 7 and 8 may be used with various substances M, including those designated by the general term of plastics materials of which the majority melt under the influence of heat before entering into combustion. This property represents an obstacle to the use of plastics materials in the aforementioned devices in so far as the load in the resonant chamber 1 melts completely and therefore produces a saturated field of substances which exceeds the capacity of the machine.

If these materials are to be treated continuously, it is firstly necessary to have a suitable supply, and this posses a technical handling problem because the stocks of this waste often consist of large imbricated pieces which are difficult to break up or to calibrate. Next, it is necessary to make liquid and solid states cohabit in the resonant chamber 1, and this poses a problem of fluctuation in the quality of the conditioned field of substances. The problem is solved with an upper wall of the resonant chamber 1 produced in the form of a grid 17 constituting the bottom of the hopper 14 and by providing a large hopper 14 (cf. FIG. 11). In this case, a smaller resonant chamber 1 may be sufficient. The heat of the resonant chamber 1, when transmitted to the mass of substances M in the hopper 14 through said grill 17, causes this mass to melt or burn, so the flow rate depends on the size of the resonant chamber 1 and will be easy to adjust as required, even using a source of external heat.

The grid 17 is also useful when using wood as substance M, the device according to the invention, which is equipped with suitable waste outlets, also constituting a burner for gas issuing from the transformation of the wood.

FIG. 11 shows a device according to the invention configured for the use of solid substances M (wood, plastics materials, etc.) in domestic or industrial devices, characterised in that one or more walls of the resonant chamber 1 consist(s) of one or more grids 17 and in that said resonant chamber 1 is equipped with additional devices (or variations thereof), for extracting the overflow or waste, for example like those shown in FIGS. 1 and 2.

The illustrated device comprises means 2 for supplying the resonant chamber 1 which consist of a large hopper 14 equipped with an upper door 15 and comprising a grip 17 which may be movable and adjustable instead of a lower door 16. The resonant chamber 1 also comprises ash collecting means 24 and discharge means 25, 25'. These means may be ash pans as well as means for discharging overflow through tubes of which the orifices are located at appropriate levels and which are connected to a central reservoir equipped with a vent 23.

The device according to this variation operates in the following manner: the substance or substances M are places in the hopper 14 which is kindled beneath the grid 17 of the resonant chamber 1. Any plastics materials are melted beforehand by a heating device applied to the bottom of the hopper 14 so that these substances M flow into the resonant chamber 1 where they are kindled in the conventional manner. Once conventional combustion has been initiated, the pulsating suction member 10 is activated.

The resultant pulsating suction acts on the soliton chamber 8, is transmitted to the resonant chamber 1 through the elongate pipe 4 and through the acoustic chamber 5 to the acoustic device 7 which reacts by imprinting a vibration on the pulsating system. The macroscopic pulsating regime lined by the vibratory effect transmitted by the acoustic chamber 5 conditions the species or aggregates issuing from the first dissociation in the form of a field or mist. The field of particles or mist is aspirated through the elongate pipe 4, arrives at the nodal plane in the region of the first opening 8' and is subjected to acceleration completed by the ignition aid 12 which ionises the field. The parameters of distance between end 4' and first opening 8', air inlets 9 and flow rate are adjusted as a function of the objective to be achieved by the pulsating suction member 10. If wood is used, the capacity of the hopper 14 allows great autonomy, a vent 23 which originates in the region of the resonant chamber 1 regulating the pressure when the upper door 15 of said hopper 14 is closed.

The collecting means 24 may be an appropriately positioned ash pan in which the ash is removed as necessary. Heating is controlled by the means controlling the distance between the first opening 8' and the end 4, the air inlets 9, the flow rate in the region of the first opening 8', manually or automatically. If the substances M are plastics materials, the large hopper 14 prevents the return of gas or smoke through the substance buffer. The ash pan is preferably placed below the orifice 6 to receive precipitated mineral charges, the discharge means 25, 25' ensuring the uniformity of operation.

Finally, a last advantageous variation of the device according to the invention will again be described, also by way of a non-limiting example. FIG. 12 shows a device according to the invention which is activated by static means for producing heat from solid substances.

The device illustrated in FIG. 12 is configured so as to be activated by a statically operating pulsating suction member 10 and is configured vertically so as to be subjected to the action of a vertical flow duct.

It consists of a vertically disposed resonant chamber 1, (virtual) elongate pipes 4 disposed at the boundary of the zone defining said resonant chamber 1 and of an acoustic chamber 5 disposed below said resonant chamber 1 with which it communicates via these elongate pipes 4 and orifices 6 via a grid 17'. A soliton chamber 8 connected to a vertical discharge duct via its first opening 8' is located above the resonant chamber 1 to which it is connected by its elongate pipe 4 and communicates with the exterior via one or more air inlets 9 having cross-sections at least equal to those of the pulsating suction member 10, in other words the static smoke duct 34, so as to compensate its effect. Owing to the vertical position of the resonant chamber 1, the supply hopper 14, which is closed at its inlet by an upper door 15 and at its outlet by a sliding lower door 16, is located laterally relative to the resonant chamber 1 of which the supply opening or openings 13 are located toward the bottom. A lining of protection or covering 1' receives and contains the gravimetric substances on a grid 17' placed above the acoustic chamber 5 equipped with an acoustic device (muff) 7, the orifices 6 through the grid 17' serving as a pinching means. Above the upper edge of this covering 1' there are one or more elements 33 for regulating the flow rates of the air inlets 9. The device is supported by a frame 66 so that the air inlets 9 and the acoustic device 7 are supplied freely by the external atmosphere. In a variation, the wall of the resonant chamber 1 may be equipped with a sheet of water in order to distribute the heat, for example over radiators.

The device illustrated in FIG. 12 operates as follows: the substance or substances M are placed in the enclosure of the lining of the bottom of the resonant chamber 1, starting from one of the supply openings 13, directly from the exterior or starting from the hopper 14. The discharge duct is open, connected by the ionisation space 11 to the first opening 8' of the soliton chamber 8 which is itself connected to the exterior by air inlets 9 of which the opening is reduced by adjustment of the elements 33 whereas the branch 34' is closed by its element 33'. The acoustic muff of the acoustic chamber 5 is open to the maximum. The load of substances M is ignited, if necessary with paper and kindling. The direct circulation created by the full drawing power of the pulsating suction member 10 (formed by the static smoke duct 34) which is not compensated owing to the reduction by the adjustment of the air inlets 9, causes the load of substances M to ignite very rapidly.

Large loaded flames develop at the boundary of the resonant chamber 1 at the outlets of the elongate pipes 4 and, as in the device in FIG. 1 reproduced here in a vertical position, a light bluish flame tends to become established after the nodal plane in the region of the first opening 8' in the ionisation space 11 subjected to the effects of the pulsating suction member 10 formed by the static smoke duct 34.

The muff is adjusted to its position of minimum passage, which causes reverberation of the acoustic chamber 5 of which the depression causes recirculation of the dissociated species in the region of the grid 17' through the orifices 6.

The adjustment of the elements 33 of the air inlets 9 is therefore completely open. The air stream supplied to the soliton chamber 8 is distributed between the first opening 8' reducing the suction of the static smoke duct 34 and the elongate pipes 4 where recirculation compensates the pronounced depression created by the initial action of said static smoke duct 34 increased by the extreme reduction of the acoustic device 7.

Everything happens as though the elongate pipe 4 had been displaced from the resonant chamber 1 toward the gaps between the irregular pieces of substance(s) M placed in the bottom of the resonant chamber 1 on the grid 17'. The flame is established at the boundary of the load in line with the gaps forming necks, and the effect of recirculation from the soliton chamber 8 through the air inlets 9 limits its development to halfway up the space between the load and the lips of the passage of the flow rate accelerator or venturi 30 of the resonant chamber 1.

Due to the oriented vibratory effect of the acoustic chamber 5, the internal mass of the substances M placed on the covering 1' and the grid 17' glows red and forms embers, the desired objective is achieved and the heat is produced inside the resonant chamber 1 of which the walls radiate toward the exterior. However, the flames keep a conventional appearance even if they are clear and bluish and oxidation is already greatly reduced in relation to a conventional system. This is due to an excess of suction by the pulsating suction member 10 which is only partially compensated at the first opening 8' by a portion of the stream delivered to the soliton chamber 8 through the air inlets 9, the other part circulating in the opposite direction through the orifices 6 and tending to partially rebalance the pressure in the resonant chamber 1.

This results in a contraction effect which is increased in the region of the mass of substances being transformed so as to create piezoelectric effects which are factors in the partial decoherence which adversely affect the quality of ionisation which is no longer complete.

To complete the reaction and obtain a maximum of radiation in the ionisation space 11 with a quality of ionisation equivalent to that of the device in FIG. 1, the depression prevailing in the resonant chamber 1 should be reduced as far as possible to atmospheric pressure.

The local degravitation of the field due to the Van der Waals forces subjected to the acoustic vibrations of the acoustic chamber 5 is therefore sufficient to transform the mass of substances into embers with a high frequency of radiation with only small flames. This result is achieved by opening the adjustment of the elements 33' of the branch 34' of the duct originating in the air inlets 9. The ionisation becomes complete, the radiation maximum, the transformation of the substances is decelerated and the waste species no longer contain oxides.

It should be noted that the use of the hopper 14 continuously assists the quality of the treatment in so far as the solid substances M are preheated before they reach the grid 17'.

The devices according to FIG. 2 and, subject to the addition of an appropriate ash pan (for example an ash pan 56) and of discharge means connected to a connecting means and a vent (for example the discharge means 25, 25' connected to the collecting means 24 and to the vent 23), those in FIGS. 7 to 11, are capable of producing noble substances.

The greater and colder the volume of the ash pan 56, the more the cloud or the field of suspended substances circulates in its volume, being widely open over the resonant chamber 1. By forcing the velocity in the region of the flow rate accelerator 30 and by opening the passage in the region of the acoustic device 7 (for example the muff), but without eliminating the acoustic effect, a condensation and precipitation factor is obtained in the vicinity of the passage of the orifice 6 and is amplified in the cold volume of the ash pan 56.

Due to a further effect, all the soliton chambers 8 are capable of producing recoverable condensates through a flow at the bottom of said soliton chamber 8, for example by means of a pipe connected to a reservoir.

In the region of the soliton chambers 8 which necessitate an increase in the pressure at the venturi and the contraction at the elongate pipe 4, however, liquid crystals are produced whereas the ash pan 56 produces oil which is more or less viscous as desired. The condensates produced by the soliton chamber 8 are generally loaded with solid aggregates and crystals of the fullerene type which are not suitable for normal internal-combustion engines owing to the presence of crystals of pure carbon in the form of microscopic diamonds which lead to wear of the segments and casings.

The present invention also relates to a process for ionisation or transformation of the substance employing a device according to the invention, characterised in that it comprises the stages consisting in:

starting up the pulsating suction member 10 and possibly an ignition aid 12, introducing the substance or substances M to be ionised or to be transformed in the resonant chamber 1, if necessary, initiating conventional preliminary combustion of the previously introduced substance or substances M, conditioning the substance or substances M in a coherent and semi-condensed steady vibratory state using the acoustic device 7 and the pulsating suction member 10, after to-ing and fro-ing several times in the resonant chamber 1, aspirating the conditioned substance or substances M via the elongate pipe or pipes 4 at the outlet of which the wave of the issuing stream of substances M generates a reflection of this incident wave in the form of a reflected wave consisting of a air stream which rises in the elongate pipe or pipes 4, compensates the negative pressure in the resonant chamber 1 and maintains the reflections between the mirror faces there, adding external air to the conditioned substance or substances M issuing from the elongate pipe or pipes 4 via the air inlets 9 situated in the vicinity of the elongate pipe or pipes 4, and ionising the conditioned substance or substances M, optionally using an ignition aid 12.

The process according to the invention is also characterised in that it also comprises a stage of optimisation of the reaction after the state of ionisation of the conditioned substance or substances M by adjusting one or more of the following parameters: opening of the acoustic device 7, power of the pulsating suction member 10, flow rate of air entering via the air inlets 9, position of the air inlets 9 relative to the nodal plane of the elongate pipe or pipes 4 or of a different nodal plane of the device, distance separating the second opening 8" from the outlet or outlets 3 of the resonant chamber 1, adjustment of the length of the elongate pipe or pipes 4, in order to adapt the rate of the ionisation reaction of the substance or substances M to the conditioning rate of said substances M in the resonant chamber 1.

According to a further characteristic, the concentrations of $SO_2$, $C_xH_y$, $NO_x$, or $O_2$ of the air rejected by the device according to the present invention are measured in order to determine the adjustment of one or more of the following parameters: power of the pulsating suction member 10, position of the air inlets 9 relative to the nodal plane of the elongate pipe or pipes 4 or of a different nodal plane of the device, flow rate of air entering via the air inlets 9, distance separating the first opening 8' from the outlet or outlets 3 of the resonant chamber 1, adjustment of the length of the pipe or pipes 4, adjustment of the acoustic device 7 in order to optimise the ionisation reaction of the substance or substances M until an $O_2$ concentration in the rejected air which is at least equivalent to the atmospheric concentration and concentrations of $SO_2$, $C_xH_y$ and/or $NO_x$, which are zero or virtually zero are obtained. According to yet another characteristic, the ignition aid 12 is extinguished when the ionisation reaction of the substance or substances M continues autonomously.

Advantageously, the energy released by the dissociated and conditioned substance or substances M is stored prior to the ionisation thereof in the form of one or more noble substances by condensation prior to ionisation of the substance(s) created in the condensate collecting means 24.

The process according to the present invention may be used for the production of thermal, chemical and/or mechanical energy. As explained hereinbefore, it may also be used for producing noble substances. The present invention also relates to an incinerator, in particular waste incinerator, an ecological heat engine, in particular for vehicles, a turbine, a ram jet as well as domestic hearths and boilers employing the device according to the invention.

The invention is obviously not limited to the embodiments described and illustrated in the accompanying drawings. Modifications are possible, in particular with regard to the constitution of the various elements or by substitution of technical equivalents without departing from the scope of protection of the invention.

The invention claimed is:

1. Device for producing a plasma by a reaction involving combustion of a substance or a mixture of substances comprising:
   a "Fabry-Perot" cavity resonant chamber for creating steady circulation of a stream of said substance or substances penetrating said resonant chamber via at least one supply means and issuing from the resonant chamber in a conditioned form, namely in a coherent and semi-condensed steady vibratory state via at least one outlet in the form of elongate pipe(s),
   an acoustic chamber communicating with said resonant chamber via an orifice and equipped with an acoustic device for generating modulatable harmonics, and
   a soliton chamber of adjustable volume for receiving the conditioned substance issuing via the elongate pipe or pipes of the resonant chamber at the same time as the soliton chamber generates recirculation of external air toward this resonant chamber via said elongate pipe or pipes, said soliton chamber being equipped with at least one adjustable flow rate air inlet and said soliton chamber defining, with a pulsating suction member adjacent to an outlet of said soliton chamber, a space for the production of ionized substance.

2. Device according to claim 1, further comprising at least one ignition aid for the substance or substances (N) conditioned in the soliton chamber.

3. Device according to claim 2, wherein the ignition aid (12) for the substance (M) conditioned in the soliton chamber is that of an internal-combustion engine.

4. Device according to claim 1, wherein the means for supplying the resonant chamber with substance(s) comprises at least one supply opening produced in said resonant chamber.

5. Device according to claim 4, wherein the at least one supply opening is topped by at least one hopper which may be equipped with an upper closure door a lower closure door and/or a lower grid.

6. Device according to claim 5, wherein the hopper or hoppers may be displaced above the supply openings of the resonant chamber from one of said supply opening to another one of said supply opening.

7. Device according to claim 5, wherein the hopper or hoppers or the injector(s) and/or nebuliser(s) comprise means for heating the substance or substances (M) introduced into the resonant chamber.

8. Device according to claim 1, wherein at least one device is provided for stirring the substance or substances (M) introduced into said resonant chamber.

9. Device according to claim 1, wherein the supply means comprises one or more injectors and/or nebulisers for the substance or substances (M) which may possibly be treated beforehand in order to obtain a presentation appropriate for said injectors and/or nebulisers.

10. Device according to claim 1, wherein the resonant chamber and/or the acoustic chamber and/or the soliton chamber and/or the elongate pipes are also provided with one or more collecting means and/or discharge means for overflow rates, residues and/or combustion condensates produced, wherein said collecting means and/or discharge means may be provided with vents, thermal protection and/or cooling and/or confinement means.

11. Device according to claim 10, wherein the collecting means are disposed below and in the vicinity of the orifice of the acoustic chamber.

12. Device according to claim 1, wherein the size and shape of the acoustic chamber depend on the distance between said orifice and said acoustic device, this distance itself being coordinated with a distance between the at least one outlet of said resonant chamber and said acoustic device.

13. Device according to claim 12, wherein the distance between said orifice and said acoustic device is a complete sub-multiple of the distance between the outlet or outlets of said resonant chamber and said acoustic device.

14. Device according to claim 12, wherein the orifice, the acoustic device and one said outlet of the resonant chamber are aligned.

15. Device according to claim 1, wherein the acoustic device is an acoustic muff or an acoustic reed.

16. Device according to claim 1, wherein the elongate pipe or pipes have adjustable lengths that are produced in the form of telescopic portions.

17. Device according to claim 1, wherein a diameter of the elongate pipe or pipes is smaller than that of the resonant chamber and greater than that of a first opening of the soliton chamber connected to the pulsating suction member in such a way that the stream of substances issuing from the resonant chamber, which tends to have the section of said first opening, leaves at least one annular space for introduction into the elongate pipe or pipes of a reflected wave comprising air which is introduced into the soliton chamber via said at least one air inlet and rises in said elongate pipe or pipes in a direction of the resonant chamber.

18. Device according to claim 17, wherein at least one recirculation guide having a smaller diameter than that of the elongate pipe or pipes is provided at least in part inside said elongate pipe or pipes, in the form of an elongate sleeve opening into the resonant chamber.

19. Device according to claim 1, wherein a natural frequency of the elongate pipe or pipes is selected to reverberate at a fundamental frequency of a wave circulating in the resonant chamber and so that a reflected wave directed from the outlet of the elongate pipe or pipes toward the resonant chamber makes up a common mode with an incident wave to promote a beat.

20. Device according to claim 1, wherein the soliton chamber has a cylindrical or quasi-cylindrical shape comprising a first opening for connection to the pulsating suction member and a second opening fitting on the elongate pipe or pipes of the resonant chamber so that a space remaining between said second opening and said elongate pipe or pipes forms said at least one air inlet for said soliton chamber.

21. Device according to claim 20, wherein the depth of nesting of the second opening, optionally extended by a sleeve, on the elongate pipe or pipes may be adjusted via a displacement of the soliton chamber, the sleeve and/or the elements in order to check an ionization reaction of the substance or substances (M), a variation in the depth of said nesting allowing a phase state of the air entering via the air inlets to be adapted so that said air stream is in phase opposition to the stream of substances (N) extracted from the resonant chamber.

22. Device according to claim 20, wherein the air inlet via the second opening of the soliton chamber is supplied in a tight manner by at least one pipe which originates at a nodal point of the device.

23. Device according to claim 1, wherein the soliton chamber has substantially a shape of a flared bell comprising a first opening on the and enlargement side for connection to the pulsating suction member a more or less curved second opening fitting on the elongate pipe or pipes of the resonant chamber so that a space remaining between said second opening and said elongate pipe or pipes forms said at least one air inlet for said soliton chamber.

24. Device according to claim 23, wherein the second opening of the soliton chamber is extended on a side with the elongate pipe or pipes by a sleeve having a diameter greater than that of the elongate pipe or pipes and a length equal to half a length of the elongate pipe or pipes, said sleeve being positioned stationarily on a free terminal end of said elongate pipe or pipes, a free space between said sleeve and said elongate pipe or pipes forming said at least one air inlet for said soliton chamber.

25. Device according to claim 24, wherein the resonant chamber, the soliton chamber and/or the pulsating suction member are mounted on one or more carriages which travel along at least one rail.

26. Device according to claim 24, wherein the elongate pipe or pipes of the resonant chamber have, on their external peripheries, elements having an external surface which increases in a direction of the resonant chamber so that a space between walls of the second opening or those of its extension by the sleeve and the external surface of said elements decreases when said second opening or said sleeve approaches said elements, thus allowing regulation of the air flow rate entering the air inlets.

27. Device according to claim 26, wherein the external surface of the elements has a shape mating with that of the second opening or that of the sleeve.

28. Device according to claim 26, wherein the elements are mounted movably on the elongate pipe or pipes, by sliding or rotation round a helical screw.

29. Device according to claim 23, wherein the second opening of the soliton chamber is extended on the side with the elongate pipe or pipes by a sleeve having a section greater than that of the elongate pipe or pipes and a length equal to half the length of the elongate pipe or pipes, said sleeve being positioned movably on a free terminal end of said elongate pipe or pipes, a free space between said sleeve and said elongate pipe or pipes forming at least one air inlet for said soliton chamber and the second opening of the soliton chamber sliding with friction on said sleeve.

30. Device according to claim 1, wherein the soliton chamber is movable relative to the resonant chamber.

31. Device according to claim 30, wherein the pulsating suction member is movable relative to the soliton chamber, a space between said soliton chamber and said pulsating suction member forming a part of a variable-port flow rate accelerator.

32. Device according to claim 31, further comprising means for forming an orientated tangential rotational circular suction movement which generates toroidal acceleration of a flux passing through the flow rate accelerator.

33. Device according to claim 1, wherein the pulsating suction member is a static smoke duct.

34. Device according to claim 1, wherein the pulsating suction member is a set of deflectors of a pulse-jet.

35. Device according to claim 1, wherein the pulsating suction member is a variable port flow rate accelerator actuated by a fan device or blowing turbine.

36. Device according to claim 1, wherein the pulsating suction member is a gas turbine of which a first blade, attached to a first opening of the soliton chamber, produces a pulsating suction.

37. Device according to claim 1, wherein the pulsating suction member is a ram-jet.

38. Device according to claim 1, wherein the pulsating suction member is an internal-combustion engine.

39. Device according to claim 1, wherein the supply means for the resonant chamber are disposed opposite said outlet of said resonant chamber and on a longitudinal axis of said elongate pipe.

40. Incinerator for waste, comprising the device according to claim 1.

41. Ecological heat engine for vehicles comprising the device according to claim 2.

42. Turbine comprising the device according to claim 1.

43. Ram jet comprising the device according to claim 1.

44. Domestic hearths and boilers comprising the device according to claim 1.

45. Process for ionization or transformation of the ionized substance employing the device according to claim 1, comprising:
    starting up the pulsating suction member and an ignition aid,
    introducing the substance or substances (M) to be ionized or to be transformed in the resonant chamber,
    initiating conventional preliminary combustion of the substance or substances to be ionized,
    conditioning the substance or substances (M) in a coherent and semi-condensed steady vibratory state using the acoustic device and the pulsating suction member,
    after to-ing and fro-ing several times in the resonant chamber, aspirating the conditioned substance or substances (M) via the elongate pipe or pipes at the outlet of which a wave of an issuing stream of substances (M) generates a reflection of said wave in the form of a reflected wave consisting of a air stream which rises in the elongate pipe or pipes, compensates a negative pressure in the resonant chamber and maintains the reflections between mirror faces there,
    adding external air to the conditioned substance or substances (M) issuing from the elongate pipe or pipes via the air inlets situated in the vicinity of the elongate pipe or pipes, and ionizing the conditioned substance or substances.

46. Process according to claim 45, further comprising a stage of optimization of the reaction after the state of ionisation of the conditioned substance or substances (M) by adjusting one or more of the following parameters: opening of the acoustic device, power of the pulsating suction member, flow rate of air entering via the air inlets, position of the air inlets relative to a nodal plane of the elongate pipe or pipes or of another nodal plane of said device, distance separating a second opening from the outlet or outlets of the resonant chamber, adjustment of the length of the elongate pipe or pipes, in order to adapt the rate of an ionization reaction of the substance or substances (M) to the conditioning rate of said substances (M) in the resonant chamber.

47. Process according to claim 46, wherein concentrations of $SO_2$, $C_xH_y$, $NO_x$ or $O_2$ of the air rejected by said device are measured in order to determine an adjustment of one or more of the following parameters: power of the pulsating suction member, position of the air inlets relative to the nodal plane of the elongate pipe or pipes or of another nodal plane of the device, flow rate of air entering via the air inlets, distance separating the first opening from the outlet or outlets of the resonant chamber, adjustment of the length of the pipe or pipes, adjustment of the acoustic device in order to optimize the ionization reaction of the substance or substances (M) until an $O_2$ concentration in the flow of effluents which is at least equivalent to an atmospheric concentration and concentrations of $SO_2$, $C_xH_y$ and/or $NO_x$ which are zero or virtually zero are obtained.

48. Process according to claim 45, wherein the ignition aid is extinguished when the ionization reaction of the substance or substances (M) continues autonomously.

49. Process according to claim 45, wherein energy released by dissociated and conditioned substance or substances (M) is stored prior to the ionization thereof in the form of one or more noble substances by condensation prior to ionization of the substance(s) created in condensate collecting means.

50. Application of the process according to claim 45 further comprising the step of harnessing the conditioned substance or substances to produce thermal energy.

51. Application of the process according to claim 45 further comprising the step of harnessing the conditioned substance or substances to produce chemical energy.

52. Application of the process according to claim 45 further comprising the step of harnessing the conditioned substance or substances to produce mechanical energy.

53. Application of the process according to claim 45 further comprising the step of harnessing the conditioned substance or substances to produce noble substances.

* * * * *